US012645822B2

(12) United States Patent
Oba et al.

(10) Patent No.: US 12,645,822 B2
(45) Date of Patent: Jun. 2, 2026

(54) CONTROL METHOD, SERVER, RECORDING MEDIUM, AND SECURITY ANALYSIS SYSTEM

(71) Applicant: Panasonic Intellectual Property Corporation of America, Torrance, CA (US)

(72) Inventors: Tatsumi Oba, Chiba (JP); Yuji Unagami, Osaka (JP); Naohisa Nishida, Kanagawa (JP); Takuji Hiramoto, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 64 days.

(21) Appl. No.: 18/613,584

(22) Filed: Mar. 22, 2024

(65) Prior Publication Data

US 2024/0232416 A1      Jul. 11, 2024

Related U.S. Application Data

(63) Continuation of application No. PCT/JP2022/038219, filed on Oct. 13, 2022.
(Continued)

(51) Int. Cl.
*G06F 21/62* (2013.01)
(52) U.S. Cl.
CPC ................................. *G06F 21/6218* (2013.01)
(58) Field of Classification Search
CPC ...... G06F 21/6218; G06F 21/55; G06F 21/64; G06F 21/57
See application file for complete search history.

(56) References Cited

U.S. PATENT DOCUMENTS 11,818,120 B2 * 11/2023 Jen .......................... G06F 21/64
2017/0223030 A1 * 8/2017 Merza ................. H04L 63/1416
(Continued)

FOREIGN PATENT DOCUMENTS

JP      2022-101716      7/2022

OTHER PUBLICATIONS

Chatziamanetoglou et al.; "CTI Blockchain-Based Sharing using Proof-of-Quality Consensus Algorithm", 2021, IEEE International Conference on Cyber Security and Resilience (CSR) Workshops, pp. 331-336. (Year: 2021).*
(Continued)

*Primary Examiner* — Hadi S Armouche
(74) *Attorney, Agent, or Firm* — Wenderoth, Lind & Ponack, L.L.P.

(57)      ABSTRACT

A control method according to the present disclosure is performed by one of a plurality of servers each including a distributed ledger and includes: obtaining request transaction data including an analysis request identification (ID) uniquely identifying a request for analysis, and an access method for accessing relevant information usable for the analysis; and recording a block including the request transaction data into the distributed ledger. The control method further includes: obtaining analysis transaction data including an analysis result corresponding to the analysis request ID, log information associated with the analysis result, and threat intelligence information serving as a basis of the analysis result; obtaining a verification result for the analysis transaction data; generating a block including the analysis transaction data; and when the verification result indicates that the validity of the analysis transaction data has been verified, recording the block including the analysis transaction data into the distributed ledger.

18 Claims, 17 Drawing Sheets

Related U.S. Application Data

(60) Provisional application No. 63/255,103, filed on Oct. 13, 2021.

(56) References Cited

U.S. PATENT DOCUMENTS

| | | | | |
|---|---|---|---|---|
| 2019/0163912 A1* | 5/2019 | Kumar | ................. | H04L 9/0825 |
| 2020/0134189 A1* | 4/2020 | Carter | .................. | G06F 21/645 |
| 2020/0358801 A1* | 11/2020 | Allouche | ............. | H04L 63/123 |
| 2021/0014065 A1* | 1/2021 | Gourisetti | ............ | H04L 9/0637 |
| 2021/0294915 A1* | 9/2021 | In | ........................ | G06F 21/6227 |
| 2021/0326786 A1* | 10/2021 | Sun | ....................... | H04L 9/3239 |
| 2021/0326886 A1* | 10/2021 | Tang | ................. | G06Q 20/4016 |
| 2022/0141240 A1* | 5/2022 | Sel | ...................... | H04L 63/1416 |
| | | | | 726/23 |
| 2022/0270102 A1* | 8/2022 | Nishida | .................. | G06Q 30/06 |
| 2022/0351306 A1* | 11/2022 | Zemenchik | ............ | G06F 16/27 |
| 2023/0091179 A1* | 3/2023 | Bari | ..................... | H04L 9/3236 |
| | | | | 713/168 |
| 2023/0169517 A1* | 6/2023 | Garner, IV | ............ | G06Q 40/02 |
| | | | | 705/35 |
| 2025/0363505 A1* | 11/2025 | Gordon | .................. | G06F 21/10 |
| 2026/0019342 A1* | 1/2026 | Perg | ..................... | H04L 41/145 |
| 2026/0025759 A1* | 1/2026 | Li | ..................... | H04W 52/0216 |

OTHER PUBLICATIONS

Purohit et al.; "DefenseChain: Consortium Blockchain for Cyber Threat Intelligence Sharing and Defense", 2020, IEEE, pp. 112-119 (Year: 2020).*

International Search Report issued Nov. 15, 2022 in International (PCT) Application No. PCT/JP2022/038219.

Cyber Threat Intelligence Technical Committee, "Indicator for Malicious URL", Sep. 2023 (URL: https://oasis-open.github.io/cti-documentation/examples/indicator-for-malicious-url).

BACnet Testing Laboratories, "BTL Listing of Tested Products", 2022 (URL: https://bacnetinternational.net/btl/).

Oasis Open, "environment", 2023 (URL: https://stix2.readthedocs.io/en/latest/api/stix2.environment.html#stix2.environment.Environment.object_similarity).

* cited by examiner

FIG. 2

| alert_type | available_log_type | available_relative_period | analysis_fee |
|---|---|---|---|
| suspicious_communication_dete cted | conn.log, firewall.log, http.log, ... | [-48h, +2h] | XXX |
| login_bruteforce_detected | conn.log, ntlm.log, kerberos.log, ... | [-48h, +2h] | XXX |
| ... | ... | ... | ... |

FIG. 3

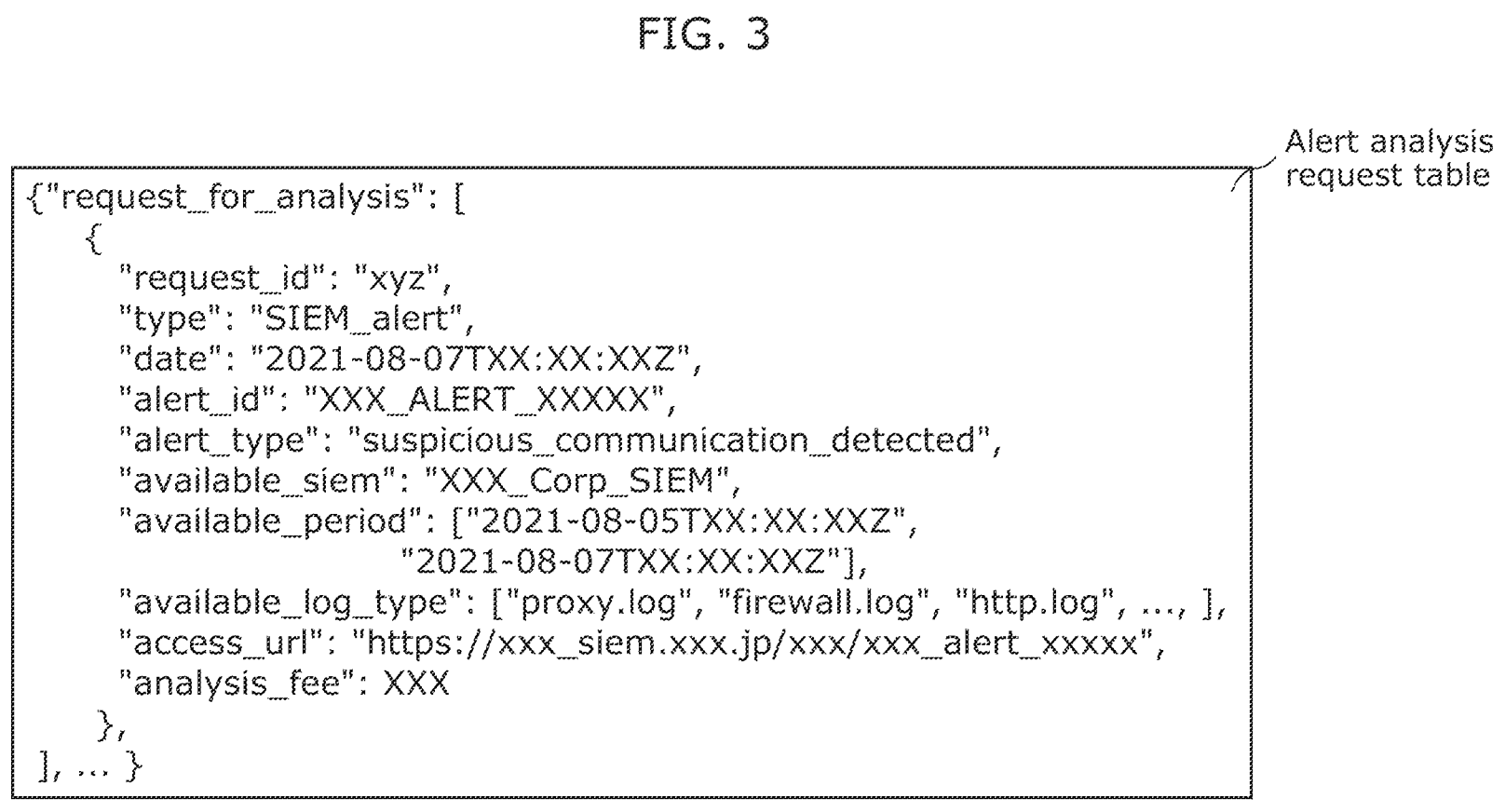

Alert analysis request table

```
{"request_for_analysis": [
  {
    "request_id": "xyz",
    "type": "SIEM_alert",
    "date": "2021-08-07TXX:XX:XXZ",
    "alert_id": "XXX_ALERT_XXXXX",
    "alert_type": "suspicious_communication_detected",
    "available_siem": "XXX_Corp_SIEM",
    "available_period": ["2021-08-05TXX:XX:XXZ",
                         "2021-08-07TXX:XX:XXZ"],
    "available_log_type": ["proxy.log", "firewall.log", "http.log", ...],
    "access_url": "https://xxx_siem.xxx.jp/xxx/xxx_alert_xxxxx",
    "analysis_fee": XXX
  },
  ...
]}
```

FIG. 5

```
{"analysis": [
  "request_id": "xyz",
  "type": "indicator",
  "log_type": "http.log",
  "date": ""2021-08-07TXX:XX:XXZ"} ,
  "threat_type": "indicator_for_malicious_url",
  "cti_id": "indicator--xxxxxxx",
  "cti_source": "https://xxx.xxx.com/xxx/" ,
},
], ...}
```

Analysis result

FIG. 6

Threat intelligence information

```
{"objects": [
    {
        "type": "indicator",
        "id": "indicator--xxxxxxxx",
        "created": "20XX-XX-XXTXX:XX:XXZ",
        "name": "Malicious site hosting downloader",
        "description": "XXXXX",
        "indicator_types": [
            "malicious-activity"
        ],
        "pattern": "[url:value = 'http://mal_xxx.com/']", ...
    },
    {
        "type": "malware",
        "id": "malware--xxxxxxxx", ..., ,
        "name": "XXXX backdoor",
        "description": "This malware attempts to download remote
                       files after establishing a foothold as a backdoor.",
        "malware_types": [
            "backdoor",
            "remote-access-trojan"
        ], ... }
```

FIG. 8A

Analysis transaction data 1

```
{"analysis": [
    {
        "type": "indicator",
        "log_type": "http.log",
        "date": ""2021-08-07TYY:YY:YYZ"} ,
        "threat_type": "indicator_for_malicious_url",
        "cti_id": "indicator--xxxxxxxx",
        "cti_source": "https://xxx.xxx.com/xxx/"
    },
], ... }
```

FIG. 8B

Analysis transaction data 2

```
{"analysis": [
    {
    "type": "indicator",
    "log_type": "http.log",
    "date": ""2021-08-07TYY:YY:YYZ"} ,
    "threat_type": "indicator_for_malicious_url",
    "cti_id": "indicator--yyyyyyyy",
    "cti_source": "https://yyy.yyy.jp/yyy/"
    },
], ... }
```

FIG. 9

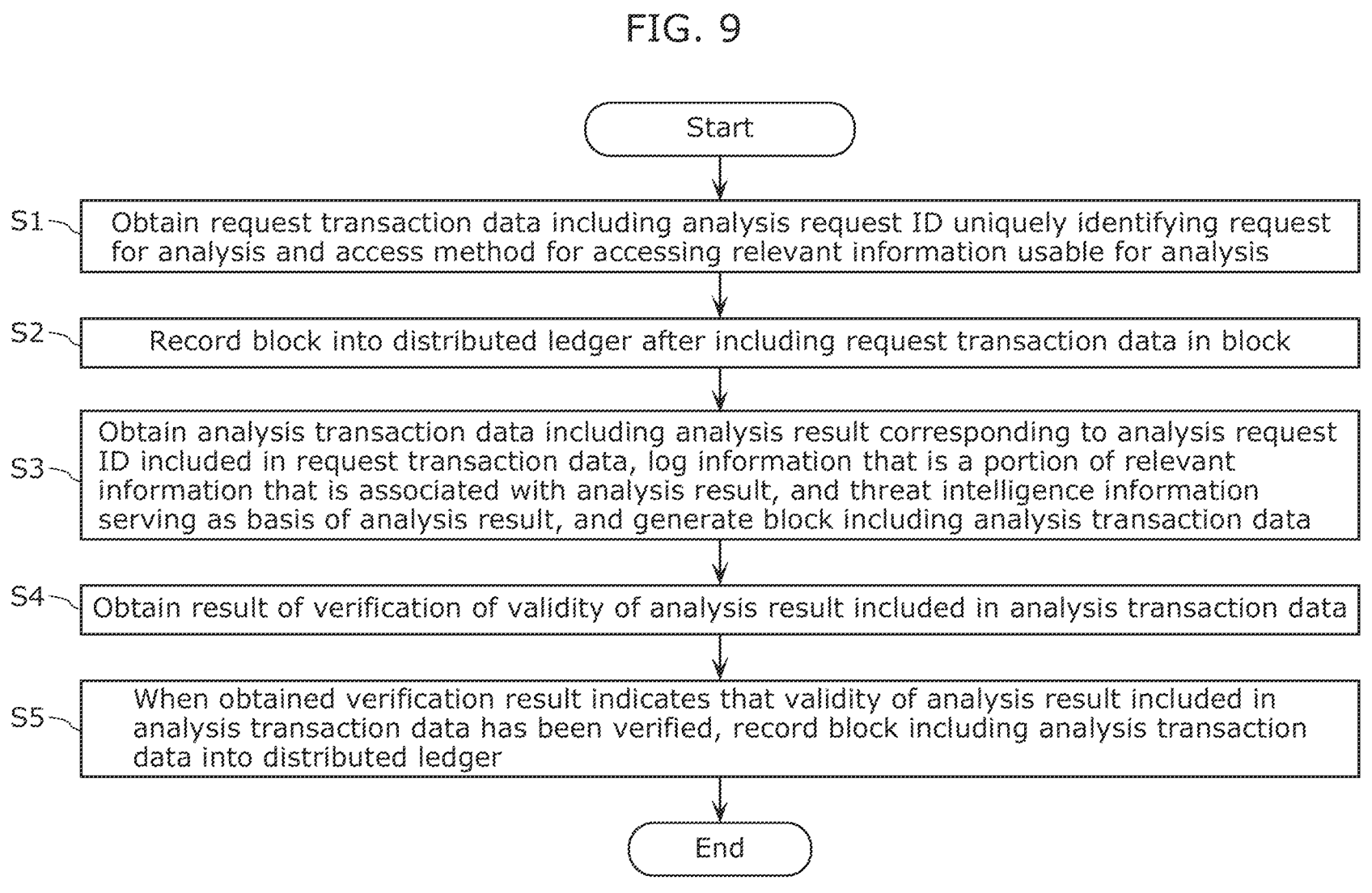

Start

S1 — Obtain request transaction data including analysis request ID uniquely identifying request for analysis and access method for accessing relevant information usable for analysis S2 — Record block into distributed ledger after including request transaction data in block S3 — Obtain analysis transaction data including analysis result corresponding to analysis request ID included in request transaction data, log information that is a portion of relevant information that is associated with analysis result, and threat intelligence information serving as basis of analysis result, and generate block including analysis transaction data S4 — Obtain result of verification of validity of analysis result included in analysis transaction data S5 — When obtained verification result indicates that validity of analysis result included in analysis transaction data has been verified, record block including analysis transaction data into distributed ledger End

FIG. 10

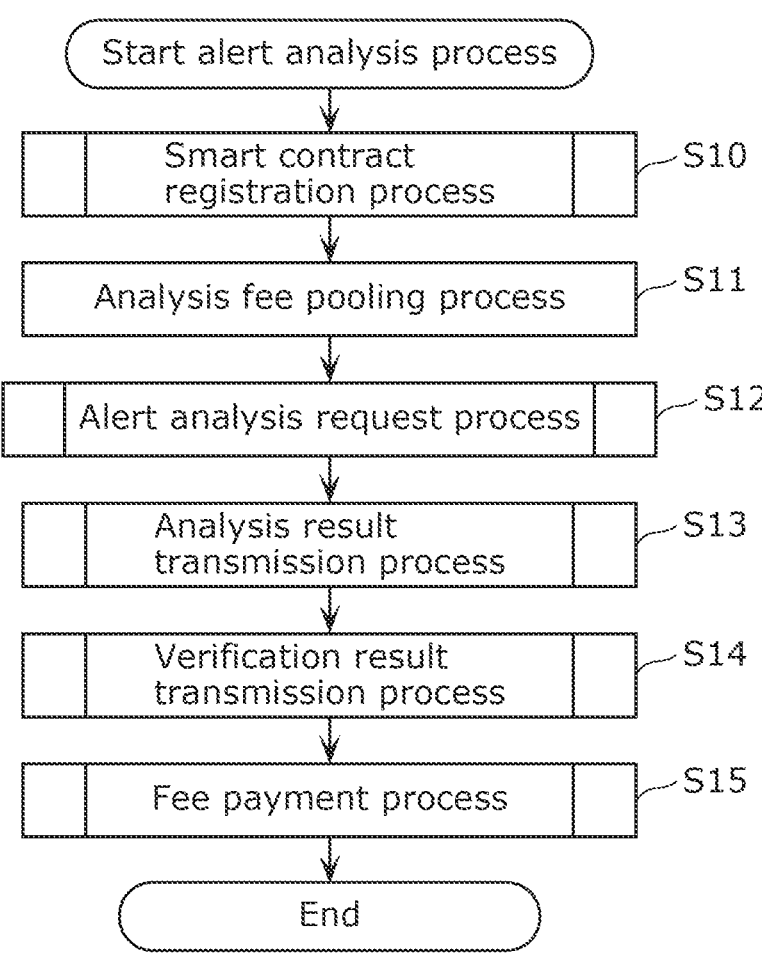

Start alert analysis process

Smart contract
registration process — S10

Analysis fee pooling process — S11

Alert analysis request process — S12

Analysis result
transmission process — S13

Verification result
transmission process — S14

Fee payment process — S15

End

FIG. 11

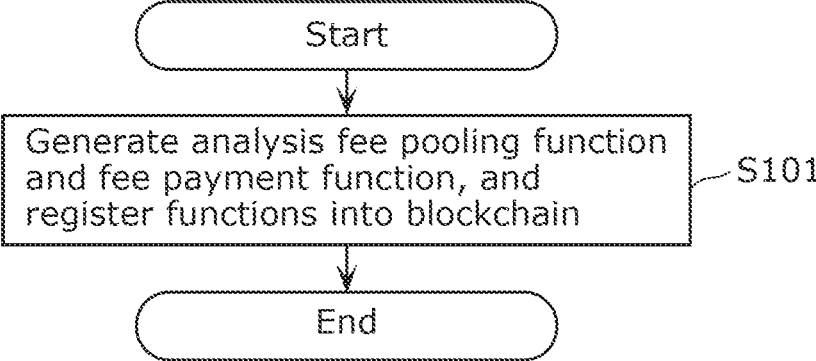

Start

Generate analysis fee pooling function
and fee payment function, and
register functions into blockchain — S101

End

FIG. 12

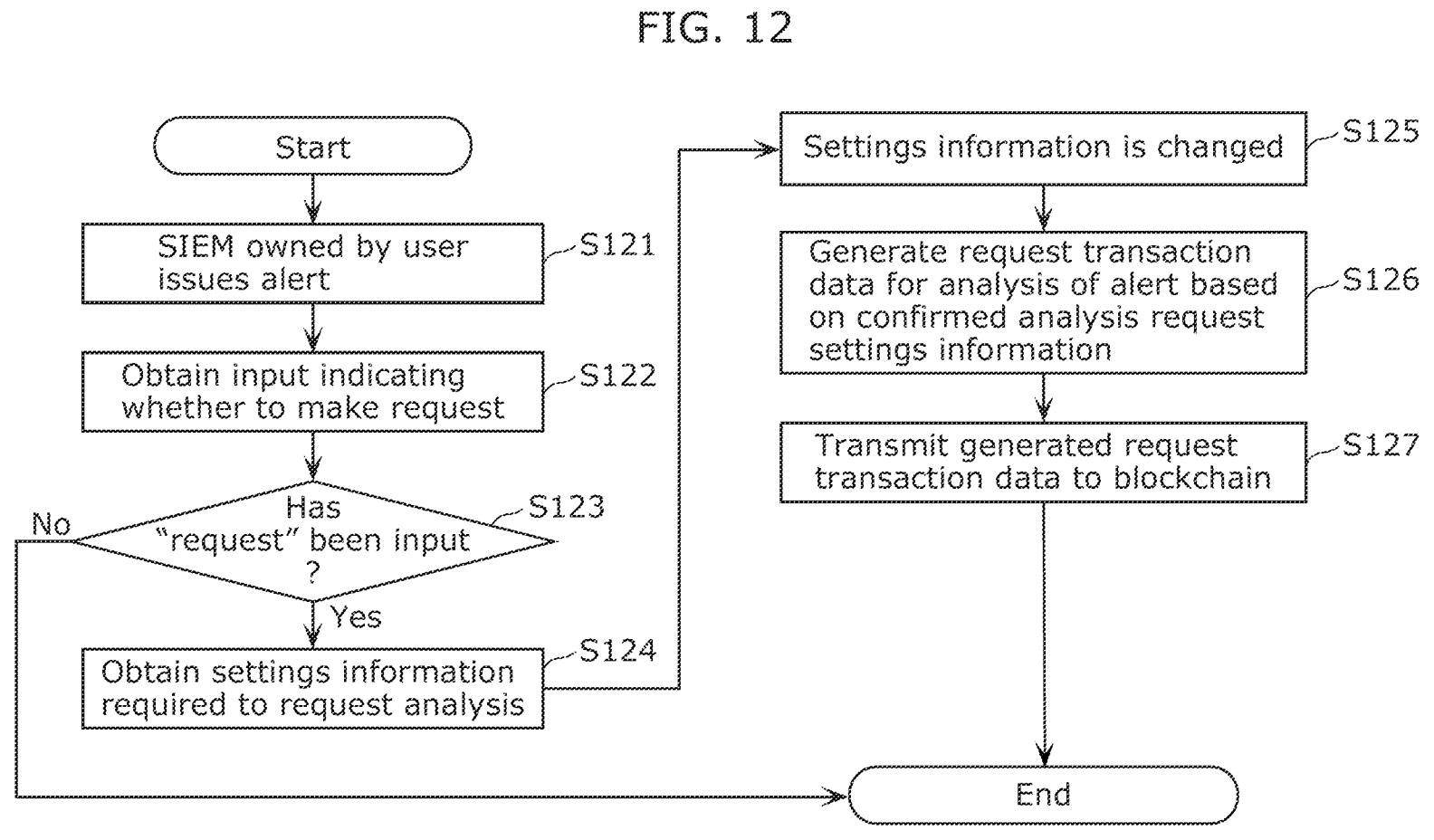

Start

SIEM owned by user issues alert — S121

Obtain input indicating whether to make request — S122

Has "request" been input ? — S123

No

Yes

Obtain settings information required to request analysis — S124

Settings information is changed — S125

Generate request transaction data for analysis of alert based on confirmed analysis request settings information — S126

Transmit generated request transaction data to blockchain — S127

End

FIG. 14

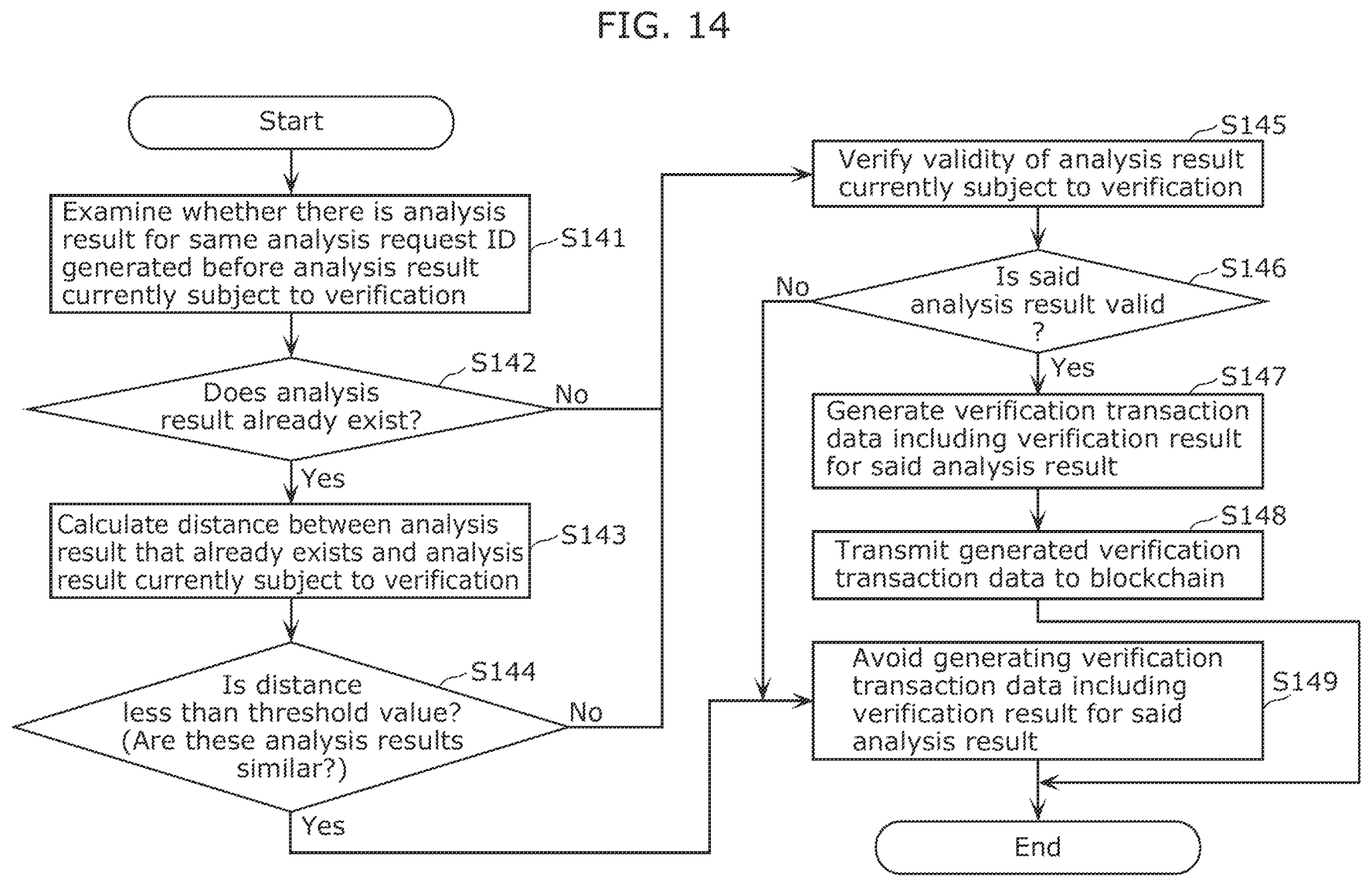

Start

Examine whether there is analysis result for same analysis request ID generated before analysis result currently subject to verification — S141

Does analysis result already exist? — S142

No →

Yes ↓

Calculate distance between analysis result that already exists and analysis result currently subject to verification — S143

Is distance less than threshold value? (Are these analysis results similar?) — S144

No

Yes →

Verify validity of analysis result currently subject to verification — S145

Is said analysis result valid? — S146

No

Yes →

Generate verification transaction data including verification result for said analysis result — S147

Transmit generated verification transaction data to blockchain — S148

Avoid generating verification transaction data including verification result for said analysis result — S149

End

CONTROL METHOD, SERVER, RECORDING MEDIUM, AND SECURITY ANALYSIS SYSTEM

CROSS REFERENCE TO RELATED APPLICATIONS

This is a continuation application of PCT International Application No. PCT/JP2022/038219 filed on Oct. 13, 2022, designating the United States of America, which is based on and claims priority of U.S. Provisional Patent Application No. 63/255,103 filed on Oct. 13, 2021. The entire disclosures of the above-identified applications, including the specifications, drawings and claims are incorporated herein by reference in their entirety.

FIELD

The present disclosure relates to control methods, servers, recording media, and security analysis systems.

BACKGROUND

For example, Patent Literature (PTL) 1 discloses a threat analysis support device, etc., capable of supporting analysis of threats to information security as a technique for analyzing threats to information security.

Meanwhile, threats to information security have become more advanced and complex, meaning that analysts are required to have a high level of expertise. Therefore, users such as companies have been increasingly requesting professional analysts to analyze an anomaly detected with an intrusion detection system (IDS), security information and event management (SIEM), or the like. For example, a security operations center (SOC) is known as a professional analyst; a user is supposed to make a contract with one SOC vendor and receive the service of monitoring threats to information security.

CITATION LIST

Patent Literature

PTL 1: Japanese Unexamined Patent Application Publication No. 2022-101716

SUMMARY

Technical Problem

However, receiving the monitoring service provided by one SOC vendor has some issues such as the rising cost of the service and limitations on available time slots. Furthermore, since only analysts belonging to the one SOC vendor analyze an anomaly, users cannot easily verify the validity of the results of analysis and are less likely to notice any frauds that may exist, which is also problematic. These problems cannot be solved even with the technique disclosed in Patent Literature 1 described above.

The present disclosure is conceived in view of the above-described circumstances and provides a control method, etc., by which the validity of the analysis result of security analysis can be verified and frauds can be reduced.

Solution to Problem

In order to achieve the aforementioned object, a control method according to one aspect of the present disclosure, which is performed by one server included in a security analysis system including a plurality of servers each including a distributed ledger, includes: obtaining request transaction data including an analysis request identification (ID) uniquely identifying a request for analysis, and an access method for accessing relevant information usable for the analysis; recording a block into the distributed ledger after including, in the block, the request transaction data obtained; obtaining analysis transaction data and generating a block including the analysis transaction data obtained, the analysis transaction data including an analysis result corresponding to the analysis request ID included in the request transaction data recorded, log information that is a portion of the relevant information that is associated with the analysis result, and threat intelligence information serving as a basis of the analysis result; obtaining a verification result that is a result of verification of validity of the analysis result included in the analysis transaction data; and when the verification result obtained indicates that the validity of the analysis result included in the analysis transaction data has been verified, recording the block including the analysis transaction data into the distributed ledger.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

Advantageous Effects

With a control method, etc., according to the present disclosure, the validity of an analysis result of security analysis can be verified, and frauds can be reduced.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a diagram illustrating one example of default settings information stored in analysis request settings storage according to an exemplary embodiment.

FIG. 3 is a diagram illustrating one example of an analysis request table according to an exemplary embodiment.

FIG. 5 is a diagram illustrating one example of an analysis result included in analysis transaction data according to an exemplary embodiment.

FIG. 6 is a diagram illustrating one example of threat intelligence information according to an exemplary embodiment.

FIG. 8A illustrates one example of an analysis result included in analysis transaction data 1 generated for the same analysis request ID according to an exemplary embodiment.

FIG. 8B illustrates one example of an analysis result included in analysis transaction data 2 generated for the same analysis request ID according to an exemplary embodiment.

FIG. 9 is a flowchart illustrating the broad outline of processing performed by a security analysis system according to an exemplary embodiment.

FIG. 10 is a flowchart illustrating the broad outline of an example of an alert analysis process according to an exemplary embodiment.

FIG. 11 is a flowchart illustrating details of a smart contract registration process illustrated in FIG. 10.

FIG. 12 is a flowchart illustrating details of an alert analysis request process illustrated in FIG. 10.

FIG. 14 is a flowchart illustrating details of a verification result transmission process illustrated in FIG. 10.

DESCRIPTION OF EMBODIMENT

Figure 1:
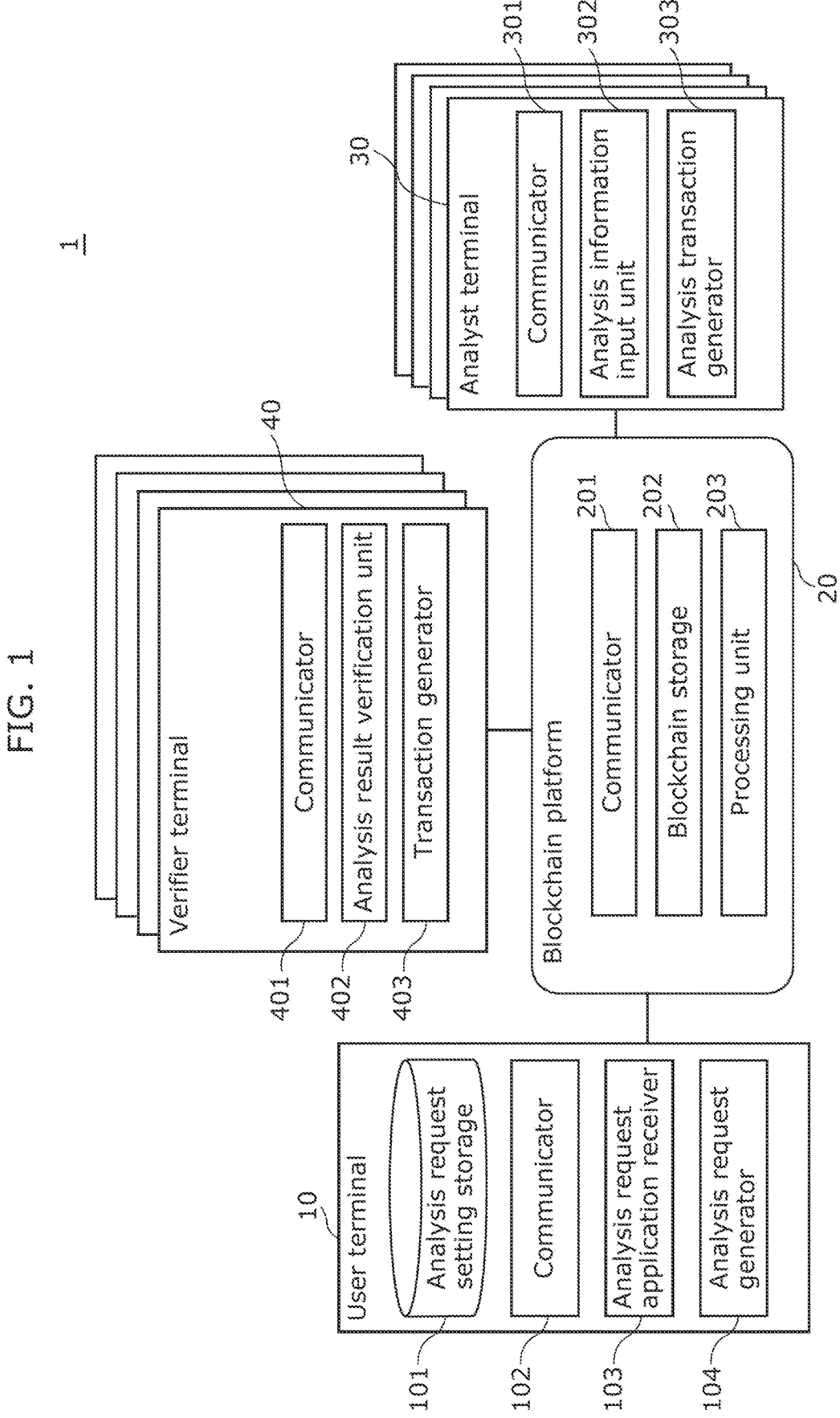
FIG. 1 is a block diagram illustrating one example of the configuration of a security analysis system according to an exemplary embodiment.

A control method according to the first aspect of the present disclosure is performed by one server included in a security analysis system including a plurality of servers each including a distributed ledger. The control method includes: obtaining request transaction data including an analysis request identification (ID) uniquely identifying a request for analysis, and an access method for accessing relevant information usable for the analysis; recording a block into the distributed ledger after including, in the block, the request transaction data obtained; obtaining analysis transaction data and generating a block including the analysis transaction data obtained, the analysis transaction data including an analysis result corresponding to the analysis request ID included in the request transaction data recorded, log information that is a portion of the relevant information that is associated with the analysis result, and threat intelligence information serving as a basis of the analysis result; obtaining a verification result that is a result of verification of validity of the analysis result included in the analysis transaction data; and when the verification result obtained indicates that the validity of the analysis result included in the analysis transaction data has been verified, recording the block including the analysis transaction data into the distributed ledger.

With this, the validity of the analysis result of the security analysis can be verified, and frauds can be reduced.

More specifically, when the validity of the analysis result included in the analysis transaction data is verified, the block including the analysis transaction data that has been generated is recorded into the distributed ledger.

This makes it possible to not only verify the validity of the analysis result of security analysis, but also reduce frauds by using the tamper-proof function of the blockchain.

Furthermore, since the request transaction data is recorded into the distributed ledger, it is possible to make a request for security analysis to two or more SOC vendors, in other words, two or more analysts, in a competitive manner, instead of making the request for security analysis to only one SOC vendor. As a result, the principle of competition can be introduced among analysts, and thus the analysis result of the security analysis can be obtained at high speed and low cost.

The control method according to the second aspect of the present disclosure is, for example, the control method according to the first aspect in which the analysis is analysis of an alert issued by a security product, the request transaction data includes information of the alert issued by the security product, the analysis request ID, and the access method, the log information included in the analysis transaction data is log information included in the relevant information, associated with the analysis result, and actually used for the analysis, and the threat intelligence information included in the analysis transaction data is threat intelligence information serving as the basis of the analysis result and corresponding to a cause of the alert.

With this, analysis of the alert that has been issued by the security product is conducted as security analysis; thus, the validity of the analysis result of the issued alert can be verified, and frauds can be reduced. Furthermore, since the principle of competition can be introduced among analysts, the result of analysis of the alert can be obtained at high speed and low cost.

Furthermore, the control method according to the third aspect of the present disclosure is, for example, the control method according to the second aspect in which the access method included in the request transaction data includes an access destination of and access rights to relevant information usable for the analysis and required for the analysis.

In this manner, a means of access to relevant information required to analyze the alert issued by the security product is provided. With this, the alert issued by the security product can be more easily analyzed.

Furthermore, the control method according to the fourth aspect of the present disclosure is, for example, the control method according to the first aspect in which the analysis is threat hunting analysis, the access method included in the request transaction data includes an access destination of and access rights to relevant information usable for the analysis and indicating an environment in which security monitoring is ongoing, the log information included in the analysis transaction data is log information included in the relevant information, associated with the analysis result, and obtained by accessing the environment, and the threat intelligence information included in the analysis transaction data is threat intelligence information serving as the basis of the analysis result and linked to the log information.

With this, the threat hunting analysis is conducted as the security analysis, and thus the validity of the analysis result of threat hunting can be verified, and frauds can be reduced. Furthermore, since the principle of competition can be introduced among analysts, the analysis result of threat hunting can be obtained at high speed and low cost.

Furthermore, the control method according to the fifth aspect of the present disclosure is, for example, the control method according to any one of the first aspect to the fourth aspect in which the request transaction data further includes: information indicating an analysis fee for the request for the analysis.

In this manner, the remuneration for the security analysis requested is provided to the analyst, which will be an incentive for the analyst to conduct the security analysis. Thus, the security analysis can be conducted promptly.

Furthermore, the control method according to the sixth aspect of the present disclosure is, for example, the control method according to any one of the first aspect to the fifth aspect that further includes: canceling the request for the analysis that is specified by the analysis request ID, when (i) cancellation transaction data including the analysis request ID and information indicating cancellation of the request for the analysis is obtained before the analysis transaction data is obtained after the request transaction data is obtained and (ii) the cancellation transaction data is recorded into the distributed ledger.

With this, after making a request for security analysis, it is possible to cancel the request when the request becomes unnecessary because there is no difference between said request and another request or when said request is incorrect, for example.

Furthermore, the control method according to the seventh aspect of the present disclosure is, for example, the control method according to any one of the first aspect to the sixth aspect in which a digital signature generated by an authorized security company is provided to the threat intelligence information included in the analysis transaction data.

In this manner, a digital signature generated by a reliable security company is provided to the threat intelligence information which is open information. With this, it is possible to prevent improper fabrication of the threat intelligence information.

Furthermore, the control method according to the eighth aspect of the present disclosure is, for example, the control method according to any one of the first aspect to the seventh aspect in which the result of the verification of the validity is a result obtained by performing matching between signature information of malware in the threat intelligence information included in the analysis transaction data and a byte sequence in a trace included in the log information included in the analysis transaction data.

In this manner, the matching is performed between a signature that is a byte sequence of packet data included in the threat intelligence information and a byte sequence of packet data included in the log information. When the result of matching shows a substantial match, this means that the validity of the analysis result has been verified.

Furthermore, the control method according to the ninth aspect of the present disclosure is, for example, the control method according to any one of the first aspect to the seventh aspect in which the result of the verification of the validity is a result obtained by performing matching between a communication establishment condition included in specification information and content of actually established communication included in the log information included in the analysis transaction data.

In this manner, the matching is performed between the communication establishment condition included in the specification information and the content of communication observed. When the result of matching shows a substantial match, this means that the validity of the analysis result has been verified.

Furthermore, the control method according to the tenth aspect of the present disclosure is, for example, the control method according to any one of the first aspect to the ninth aspect in which the request transaction data further includes one or more tags each indicating a type of the analysis, and the analysis transaction data further includes one or more tags each indicating the type of the analysis conducted to obtain the analysis result.

Thus, when each of the request transaction data and the analysis transaction data includes a tag indicating the type of analysis, whether to analyze the cause of the alert, the impact range of the alert, the presence or absence of infection, or stolen data, for example, is clarified as the item that is determined by the analysis. This makes it possible to more easily verify the validity of the analysis result of the security analysis.

Furthermore, the control method according to the eleventh aspect of the present disclosure is, for example, the control method according to any one of the first aspect to the tenth aspect in which information that is included in the access method and able to identify a user who makes the request for the analysis has been anonymized.

Thus, since the information that can identify a user who makes a request for the analysis such as an IP address and a MAC address is anonymized, the user can obtain the analysis result of the security analysis without being identified.

Furthermore, the control method according to the twelfth aspect of the present disclosure is, for example, the control method according to any one of the first aspect to the eleventh aspect in which the access method included in the request transaction data includes remote access rights to security information and event management (SIEM) that is used by a user who makes the request for the analysis.

This provides a means of access capable of obtaining relevant information usable for the analysis via SIEM which is a security product being used by a user who makes a request for the analysis. Thus, the security analysis can be more easily conducted.

Furthermore, the control method according to the thirteenth aspect of the present disclosure is, for example, the control method according to any one of the first aspect to the twelfth aspect in which the access method included in the request transaction data includes information indicating an operation to obtain log information required for the analysis, the information being included in the relevant information usable for the analysis.

This provides an operation to obtain the log information required for the analysis as a means of access capable of obtaining the relevant information usable for the analysis. Thus, the security analysis can be more easily conducted.

Furthermore, the control method according to the fourteenth aspect of the present disclosure is, for example, the control method according to any one of the first aspect to the thirteenth aspect in which when the verification result obtained indicates that the analysis transaction data has been excluded from verification, the analysis transaction data is not recorded into the distributed ledger.

Furthermore, the control method according to the fifteenth aspect of the present disclosure is, for example, the control method according to the fourteenth aspect in which a degree of similarity between the analysis result included in the analysis transaction data currently subject to the verification and the analysis result included in the analysis transaction data that has been generated earlier than the analysis transaction data currently subject to the verification is calculated, and when the degree of similarity calculated exceeds a predetermined threshold value, the verification of the validity of the analysis result included in the analysis transaction data currently subject to the verification is skipped, and the verification result indicates that the analysis transaction data currently subject to the verification has been excluded from the verification.

In this manner, when two or more pieces of analysis transaction data including the same analysis result are generated for one request for security analysis, the analysis result included in the analysis transaction data that has not been generated first is not verified, and the analysis transaction data is not recorded into the distributed ledger. As a result, the principle of competition can be introduced among analysts, and thus the analysis result of the security analysis can be obtained at high speed and low cost.

A server according to one aspect of the present disclosure, which is included in a security analysis system including a plurality of servers each including a distributed ledger, includes: a processor; and memory. Using the memory, the processor obtains request transaction data including an analysis request identification (ID) uniquely identifying a request for analysis, and an access method for accessing relevant information usable for the analysis. The processor records a block into the distributed ledger after including, in the block, the request transaction data obtained. The processor obtains analysis transaction data and generates a block including the analysis transaction data obtained, the analysis transaction data including an analysis result corresponding to the analysis request ID included in the request transaction data recorded, log information that is a portion of the relevant information that is associated with the analysis result, and threat intelligence information serving as a basis of the analysis result. The processor obtains a verification result that is a result of verification of validity of the analysis result included in the analysis transaction data. When the verification result obtained indicates that the validity of the analysis result included in the analysis transaction data has been verified, the processor records the block including the analysis transaction data into the distributed ledger.

A security analysis system according to one aspect of the present disclosure includes: a user terminal that requests analysis; an analyst terminal that conducts the analysis requested; and a plurality of servers each including a distributed ledger. One server included in the plurality of servers includes a processor and memory. Using the memory, the processor obtains, from the user terminal, request transaction data including an analysis request identification (ID) uniquely identifying a request for the analysis, and an access method for accessing relevant information usable for the analysis. The processor records a block into the distributed ledger after including, in the block, the request transaction data obtained. The processor obtains, from the analyst terminal, analysis transaction data including an analysis result corresponding to the analysis request ID included in the request transaction data recorded, log information that is a portion of the relevant information that is associated with the analysis result, and threat intelligence information serving as a basis of the analysis result. The processor obtains a verification result that is a result of verification of validity of the analysis result included in the analysis transaction data, and generates a block including the analysis transaction data. When the verification result obtained indicates that the validity of the analysis result included in the analysis transaction data has been verified, the processor records the block including the analysis transaction data into the distributed ledger.

Hereinafter, an exemplary embodiment will be described with reference to the drawings. Note that each exemplary embodiment described below shows one specific preferred example of the present disclosure. In other words, the numerical values, structural elements, the arrangement and connection of the structural elements, steps, the processing order of the steps etc., shown in the following exemplary embodiment are mere examples, and are not intended to limit the present disclosure. The present disclosure is defined based on the recitations of the Claims. Therefore, among the structural elements in the following exemplary embodiment, structural elements not recited in any one of the independent claims are not necessarily required to achieve the object of the present disclosure, but are described as structural elements of a more preferred exemplary embodiment.

Exemplary Embodiment

Hereinafter, a security analysis system according to an exemplary embodiment will be described with reference to the drawings.

[Configuration of Security Analysis System 1]

Security analysis system 1 according to the present disclosure provides a system for outsourcing security analysis on a blockchain and can enable verification of the validity of the analysis result of the security analysis and reduce frauds.

FIG. 1 is a block diagram illustrating one example of the configuration of security analysis system 1 according to an exemplary embodiment.

Security analysis system 1 according to the present exemplary embodiment includes user terminal 10, blockchain platform 20, one or more analyst terminals 30, and one or more verifier terminals 40, as illustrated in FIG. 1. These are connected via a network not illustrated in the drawings so as to be able to communicate with each other. Examples of the network, which may include any communication line or any network, include the Internet. Note that FIG. 1 illustrates an example of when security analysis system 1 includes a plurality of analyst terminals 30 and a plurality of verifier terminals 40, but this is not limiting. In other words, it is sufficient that security analysis system 1 include one or more analyst terminals 30 and one or more verifier terminals 40.

[User Terminal 10]

User terminal 10 is a terminal device such as a personal computer or a tablet used by a user company or facility that has introduced IDS or SIEM as a security product. User terminal 10, which can be connected to the network, can communicate with a plurality of servers included in blockchain platform 20.

In the present exemplary embodiment, user terminal 10 is used in a user company or a user facility, and makes, as a request for security analysis, a request for analysis of an alert issued by a security product. Note that the security analysis is not limited to the analysis of the alert. The analysis conducted at the SOC includes threat hunting; thus, the security analysis may be threat hunting analysis. The threat hunting analysis is an approach to be applied to threats that are hard to detect by an existing method and in which assuming that said threats have already intruded, suspicious logs, etc., are collected and what is happening in the network is analyzed.

User terminal 10 includes analysis request settings storage 101, communicator 102, analysis request application receiver 103, and analysis request generator 104, as illustrated in FIG. 1. User terminal 10 includes: a processor; memory in which a program for causing the processor to perform a predetermined process is stored; and a communication interface, for example. This means that user terminal 10 provides the functions of elements by the processor executing a predetermined program using the memory.

Hereinafter, the elements will be described.

<Analysis Request Settings Storage 101>

Analysis request settings storage 101 stores default settings information required to make a request for security analysis. Analysis request settings storage 101 is provided as a hard disc drive (HDD), a solid state drive (SSD), or the like.

FIG. 2 is a diagram illustrating one example of default settings information stored in analysis request settings storage 101 according to the exemplary embodiment. FIG. 2 illustrates one example of default settings information to be used when SIEM owned by a user issues an alert.

FIG. 2 illustrates default settings information including information indicating which log is accessible (available_log_type) for each type of alerts (alert_type) and information of a designated available log period for each type of alerts (alert_type). Furthermore, the default settings information may include information of an analysis fee (analysis_fee). Note that the settings information is default values and therefore can be changed. In the example illustrated in FIG. 2, suspicious communication and a brute-force attack are indicated as the type of alerts.

<Communicator 102>

Communicator 102, which is a wired or wireless communication interface, communicates with the plurality of servers included in blockchain platform 20. Furthermore, communicator 102 transmits transaction data and obtains an analysis result confirmation notification, for example.

In the present exemplary embodiment, communicator 102 transmits, to one of the plurality of servers included in the blockchain platform, request transaction data or transaction data for registering an analysis fee that has been generated by analysis request generator 104 to be described later. There are also cases where communicator 102 transmits, to the one server, cancellation transaction data generated by analysis request generator 104 to be described later.

<Analysis Request Application Receiver 103>

Analysis request application receiver 103 receives user input indicating whether to make a request for security analysis to blockchain platform 20. When analysis request application receiver 103 receives the input indicating that the request for security analysis is to be made, analysis request application receiver 103 obtains, from analysis request settings storage 101, settings information required to make a request for security analysis, and when the pieces of the settings information obtained do not need to be changed, confirms the obtained settings information as analysis request settings information.

Furthermore, analysis request application receiver 103 receives user input indicating whether to perform an analysis fee pooling process.

Note that when a user wishes to cancel a request for analysis, analysis request application receiver 103 receives input of an analysis request ID indicating the request for analysis to be canceled and information indicating that the request for analysis is to be canceled.

<Analysis Request Generator 104>

Analysis request generator 104 generates request transaction data including: an analysis request ID uniquely identifying a request for analysis; and an access method for accessing relevant information usable for analysis.

More specifically, analysis request generator 104 generates request transaction data including: information of an alert issued by a security product; an analysis request ID uniquely identifying a request for analysis; and an access method for accessing relevant information usable for analysis. When such request transaction data is generated, analysis of the alert issued by the security product is conducted as security analysis. The access method included in the request transaction data may include an access destination of and access rights to relevant information usable for analysis of the alert and required for the analysis. Including such an access method leads to providing a means of access to the relevant information required to analyze the alert issued by the security product. With this, the alert issued by the security product can be more easily analyzed.

The request transaction data may further include information indicating an analysis fee for the request for analysis or may include one or more tags each indicating the type of analysis. When the request transaction data includes the information indicating the analysis fee, which means that remuneration for the security analysis requested will be provided to an analyst, this will be an incentive for the analyst to conduct the security analysis. Thus, it can be expected that the security analysis may be conducted promptly. Furthermore, when the request transaction data includes the tag indicating the type of analysis, whether to analyze the cause of the alert, the impact range of the alert, the presence or absence of infection, or stolen data, for example, is clarified as the item to be determined by the analysis.

Note that the access method included in the request transaction data may include remote access rights to the SIEM that is used by a user who makes the request for analysis or may include information indicating an operation to obtain log information required for the analysis that is included in the relevant information usable for the analysis. When the access method includes remote access rights to the SIEM, a means of access is provided that is capable of obtaining the relevant information usable for the analysis via the SIEM which is a security product being used by a user who makes the request for analysis. Thus, the security analysis can be more easily conducted. Furthermore, when the access method includes information indicating an operation to obtain the log information required for the analysis, an operation to obtain the log information required for the analysis is provided as the means of access capable of obtaining the relevant information usable for the analysis. Thus, the security analysis can be more easily conducted.

Furthermore, in the information included in the access method included in the request transaction data, information that can identify a user who makes the request for analysis may have been anonymized. Thus, since the information that can identify a user who makes the request for analysis such as an IP address and a MAC address is anonymized, the user can obtain the analysis result of the security analysis without being identified.

In the present exemplary embodiment, on the basis of the confirmed analysis request settings information, analysis request generator 104 generates, in order to make a request for security analysis, request transaction data including information indicating the request for security analysis. More specifically, on the basis of the confirmed analysis request settings information, analysis request generator 104 generates an analysis request table, and generates request transaction data including data indicating the generated analysis request table.

FIG. 3 is a diagram illustrating one example of the analysis request table according to the exemplary embodiment. FIG. 3 illustrates one example of the alert analysis request table generated by user terminal 10 when SIEM owned by a user issues an alert.

As illustrated in FIG. 3, the alert analysis request table includes at least: an analysis request ID (request_id) of the alert; time (date) at which the alert was generated in a user environment; and the type of the alert (alert_type) defined in the user environment. The alert analysis request table may include the identifier of the alert (alert_id) defined in the user environment.

Furthermore, the alert analysis request table includes an access method for accessing relevant information that an analyst can use in analysis of the alert. In the example illustrated in FIG. 3, the access method includes: the name of SIEM software (available_siem) that can be used by an analyst; a SIEM log period (available_period) in which access by an analyst is allowed; the type of a log (available_log_type) that can be used by an analyst; and URL (access_url) for an analyst to access the SIEM, for example. Note that the access method may be the IDS log of the issued alert and a means of access to a user analysis environment. Furthermore, the alert analysis request table illustrated in FIG. 3 includes an analysis fee (analysis_fee) to be paid when analysis of the alert is conducted.

As just described, the analysis request table illustrated in FIG. 3 includes: the information of the alert issued by the security product; the analysis request ID; the access method for accessing the relevant information usable for analysis; and the analysis fee.

Furthermore, when analysis request application receiver 103 receives input indicating that the process of pooling the analysis fee is to be performed, analysis request generator 104 generates transaction data for registering a pooled fund for payment of the analysis fee.

Note that when analysis request application receiver 103 receives input of an analysis request ID indicating the request for analysis that is to be canceled and information indicating that the request for analysis is to be canceled, analysis request generator 104 generates cancellation transaction data including the analysis request ID and the information indicating cancellation of the request for analysis. When making a request for threat hunting analysis instead of analysis of an alert, it is sufficient that the access method included in the request transaction data include an access destination of and access rights to relevant information usable for threat hunting analysis and indicating an environment in which security monitoring is ongoing. Accordingly, threat hunting analysis is conducted as the security analysis.

[Blockchain Platform 20]

Blockchain platform 20, which can provide blockchains, such as Ethereum, EOS, Ripple, NEM, Quorum, and Hyperledger Fabric, includes a plurality of nodes. The plurality of nodes are connected via a network so as to be able to communicate with each other and operate independently. The plurality of nodes are servers, for example, but some nodes may be smartphones, tablets, or personal computers. The present exemplary embodiment assumes that blockchain platform 20 includes a plurality of servers and provides a blockchain such as Ethereum, for example. Each of the plurality of servers includes a distributed ledger, and the blockchain is stored in the distributed ledger. In other words, each of the plurality of servers manages the blockchain.

Each of the plurality of servers included in blockchain platform 20 includes communicator 201, blockchain storage 202, and processing unit 203, as illustrated in FIG. 1. Each of the plurality of servers can provide a communication function and a processing function by a processor such as a central processing unit (CPU) executing a program using memory, for example.

<Communicator 201>

Communicator 201, which is a wired or wireless communication interface, performs communication with another server and performs communication with user terminal 10, analyst terminal 30, or verifier terminal 40 connected to the network.

In the present exemplary embodiment, communicator 201 can transmit and obtain transaction data, for example. Furthermore, communicator 201 may obtain a result of verification of the validity of the analysis result.

More specifically, communicator 201 obtains request transaction data including: an analysis request ID uniquely identifying a request for analysis; and an access method for accessing relevant information usable for the analysis, for example. Furthermore, communicator 201 obtains analysis transaction data including: an analysis result corresponding to the analysis request ID included in the request transaction data; log information that is a portion of the relevant information that is associated with the analysis result; and threat intelligence information serving as the basis of the analysis result, for example. Moreover, communicator 201 obtains the result of verification of the validity of the analysis result included in the analysis transaction data, for example. Note that there are also cases where communicator 201 obtains transaction data including the result of verification of the validity of the analysis result. Examples of the request for analysis include not only a request for analysis of an alert, but also a request for threat hunting analysis.

<Blockchain Storage 202>

In blockchain storage 202, a blockchain having the same content as a blockchain in another server or the like is stored. A distributed ledger is stored in blockchain storage 202, and a blockchain is stored in the distributed ledger. Note that blockchain storage 202 is provided as a hard disc drive (HDD), a solid state drive (SSD), or the like.

<Processing Unit 203>

Processing Unit 203 can provide the following processing functions by a processor such as a CPU executing a program using memory, for example.

In the present exemplary embodiment, processing unit 203 executes a consensus algorithm for the transaction data with other servers, and verifies the obtained transaction data, for example. Processing unit 203 can verify the obtained transaction data by determining, for example, whether the format of the obtained transaction data is correct and whether the signature on the obtained transaction data is authentic.

Furthermore, processing unit 203 also performs the process of recording, into the distributed ledger, in other words, the blockchain, the transaction data for which the consensus algorithm has been executed. Processing unit 203 generates a block on the blockchain that includes one or more transaction data for which the consensus algorithm has been executed, and records the block into the blockchain. Furthermore, processing unit 203 performs the process of executing a smart contract that has been recorded into the distributed ledger, in other words, the blockchain, and is operating in the in-memory database.

More specifically, processing unit 203 records a block into the distributed ledger, in other words, the blockchain, after including, in the block, the request transaction data obtained by communicator 201, for example. Furthermore, for example, when the verification result obtained by communicator 201 indicates that the validity of the analysis result included in the analysis transaction data has been verified, processing unit 203 records a block into the distributed ledger after including the analysis transaction data in the block.

Furthermore, processing unit 203 generates a block including verification transaction data for specific analysis transaction data, and records the block into the distributed ledger, in other words, the blockchain. As triggered by this operation, processing unit 203 performs the process of causing the smart contract operating in the in-memory database to be executed, and sending the analysis fee to an analyst who has created the specific analysis transaction data and an analyst who has created the verification transaction data.

Note that when processing unit 203 obtains the cancellation transaction data before obtaining the analysis transaction data after obtaining the request transaction data, processing unit 203 performs the process of recording, into the distributed ledger, in other words, the blockchain, a block including the cancellation transaction data. In this case, the analysis request specified by the analysis request ID included in the cancellation transaction data is canceled. Thus, after making a request for security analysis, it is possible to cancel the request when the request becomes unnecessary because there is no difference between said request and another request or when said request is incorrect, for example.

[Analyst Terminal 30]

Analyst terminal 30 is a terminal device such as a personal computer or a tablet being used by a SOC vendor or the like. Note that analyst terminal 30 may be used by an individual who is an analyst. Analyst terminal 30, which can be connected to the network, can communicate with the plurality of servers included in blockchain platform 20.

In the present exemplary embodiment, an analyst who belongs to a SOC vendor or the like uses analyst terminal 30. Analyst terminal 30 conducts security analysis using specifications and threat intelligence information on the basis of the request for security analysis that has been recorded into the blockchain, thus generates an analysis result, and generates analysis transaction data including the analysis result generated. Analyst terminal 30 includes communicator 301, analysis information input unit 302, and analysis transaction generator 303, as illustrated in FIG. 1. Analyst terminal 30 includes: a processor; memory in which a program for causing the processor to perform a predetermined process is stored; and a communication interface, for example. This means that analyst terminal 30 provides the functions of elements by the processor executing a predetermined program using the memory.

Hereinafter, the elements will be described.

<Communicator 301>

Communicator 301, which is a wired or wireless communication interface, communicates with the plurality of servers included in blockchain platform 20. In the present exemplary embodiment, communicator 301 accesses the request transaction data recorded in the blockchain, to obtain information included in the request transaction data and transmit transaction data, for example.

In the present exemplary embodiment, communicator 301 accesses the request transaction data recorded in the blockchain, and obtains the information of the alert, the analysis request ID, and the access method for accessing the relevant information usable for analysis. Furthermore, communicator 301 transmits, to one of the plurality of servers included in the blockchain platform, the analysis transaction data generated by analysis transaction generator 303 to be described later.

<Analysis Information Input Unit 302>

Analysis information input unit 302 obtains information included in the request transaction data that has been input by communicator 301. Using the threat intelligence information open to the public, an analyst inputs, to analysis information input unit 302, the analysis result obtained by conducting security analysis. When the analysis result is input to analysis information input unit 302, analysis information input unit 302 obtains the analysis result.

In the present exemplary embodiment, analysis information input unit 302 obtains the information of the alert, the analysis request ID, and the access method for accessing the relevant information usable for analysis that are included in the request transaction data that has been input by communicator 301. Using the access method obtained, analysis information input unit 302 obtains the log information and the broad outline of the alert required for an analyst to conduct security analysis.

The analyst inputs, to analysis information input unit 302, an analysis result that is a result obtained by conducting analysis of the alert using the broad outline of the alert and the log information that have been obtained and the threat intelligence information that is open to the public. In this manner, analysis information input unit 302 can obtain the analysis result corresponding to the analysis request ID included in the request transaction data.

Figure 4:
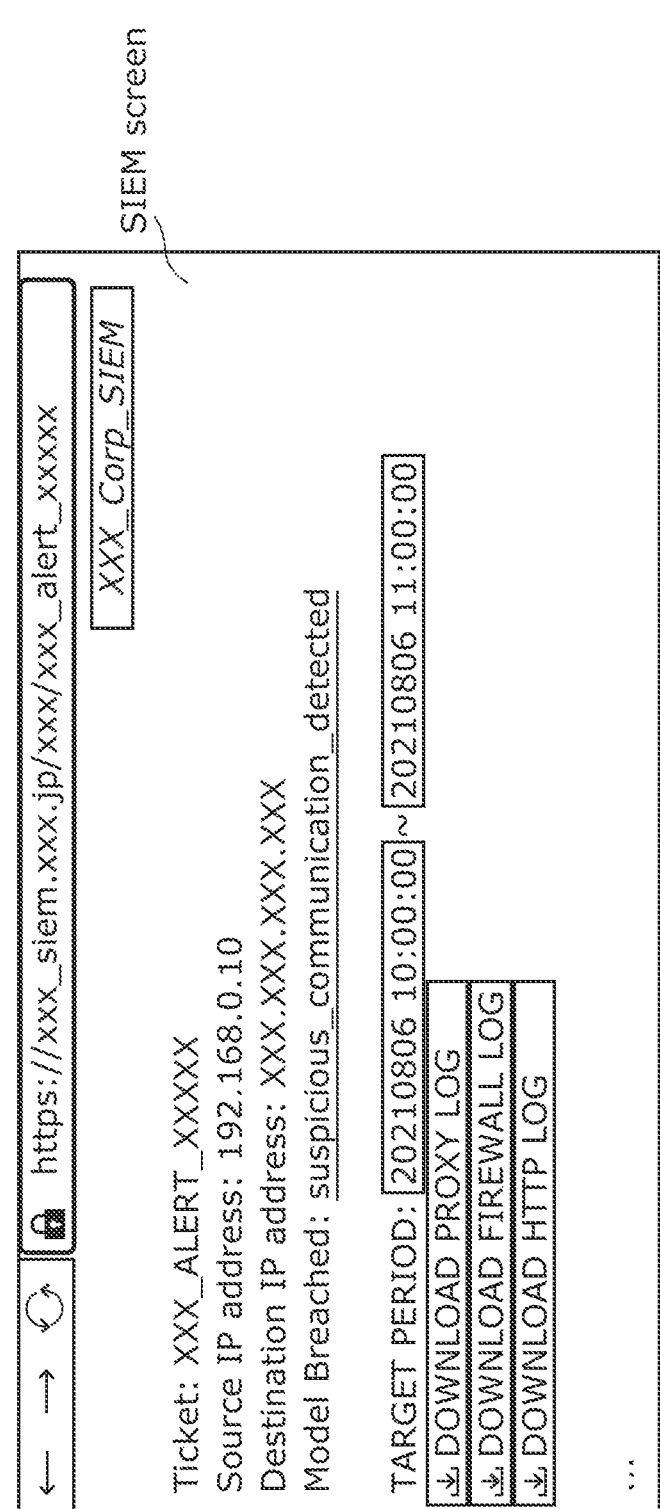
FIG. 4 is a diagram illustrating one example of a screen of a security product on which an access method according to an exemplary embodiment is performed.

FIG. 4 is a diagram illustrating one example of a screen of a security product on which the access method according to the exemplary embodiment is performed. FIG. 4 illustrates one example of when the broad outline of the alert issued by SIEM owned by a user and the log information required for analysis can be obtained via the screen of the SIEM by accessing URL (access_url) indicated in FIG. 3.

Note that in the example illustrated in FIG. 4, the information shown in the row "Ticket" to the row "Model Breached" indicates the broad outline of the alert, that is, the information related to the alert, and the information shown in the rows below "Model Breached" indicates that the log information for a specific period can be obtained by downloading.

<Analysis Transaction Generator 303>

Analysis transaction generator 303 generates analysis transaction data on the basis of the analysis result that has been input to analysis information input unit 302.

More specifically, analysis transaction generator 303 generates analysis transaction data including: an analysis result corresponding to the analysis request ID included in the request transaction data; log information that is a portion of the relevant information that is associated with the analysis result; and threat intelligence information serving as the basis of the analysis result. The log information included in the analysis transaction data is log information included in the relevant information, associated with the analysis result, and actually used for the analysis. The threat intelligence information included in the analysis transaction data is threat intelligence information serving as the basis of the analysis result and corresponding to the cause of the alert. Note that a digital signature generated by an authorized security company may be provided to the threat intelligence information included in the analysis transaction data. In this manner, when the digital signature generated by a reliable security company is provided to the threat intelligence information which is open information, it is possible to prevent improper fabrication of the threat intelligence information.

The analysis transaction data may further include one or more tags each indicating the type of analysis conducted in order to obtain the analysis result. When the analysis transaction data includes the tag indicating the type of analysis, it is possible to clarify items determined by the analysis, such as whether to analyze the cause of the alert, the impact range of the alert, the presence or absence of infection, or stolen data. With this, the verification of the validity of the analysis result, which will be described later, may be made easier.

FIG. 5 is a diagram illustrating one example of the analysis result included in the analysis transaction data according to the exemplary embodiment.

The analysis result illustrated in FIG. 5 includes: an analysis request ID (request_id); time (date) at which the alert was generated in a user environment; the identifier of the alert (alert_id) in the user environment that is not illustrated in the drawings; and the type (type) of the analysis result. Furthermore, the analysis result illustrated in FIG. 5 also includes: the type of a log (log_type) used by the analyst; and the type of threat (threat_type) of the alert analyzed by the analyst. The analysis result illustrated in FIG. 5 further includes: the identifier of the threat intelligence information (cti_id) that is open to the public and has been used by the analyst; and the information source of the threat intelligence information (cti_source) that is open to the public and has been used by the analyst, for example.

As just described, the analysis result illustrated in FIG. 5 includes: the analysis result corresponding to the analysis request ID; the log information that is a portion of the relevant information that is associated with the analysis result; and the threat intelligence information serving as the basis of the analysis result.

FIG. 6 is a diagram illustrating one example of the threat intelligence information according to the exemplary embodiment.

The threat intelligence information illustrated in FIG. 6 is detailed information of the threat intelligence information included in the analysis result illustrated in FIG. 5 and is open to the public.

The threat intelligence information illustrated in FIG. 6 includes: the type (type) of the threat intelligence information; the identifier (id) of the threat t intelligence information; and characteristics (pattern) indicating the occurrence of a threat. The identifier (id) of the threat intelligence information is the same as the identifier of the threat intelligence information (cti_id) included in the analysis result illustrated in FIG. 5. In FIG. 6, "indicator" indicates the characteristics of a threat used to detect the threat. The threat intelligence information illustrated in FIG. 6 is written in the Structured Threat Information expression (STIX) which is a standardized and structured format for describing threat information.

Note that as illustrated in FIG. 6, the threat intelligence information includes information about what information is specified and when the information was generated.

[Verifier Terminal 40]

Verifier terminal 40 is a terminal device such as a personal computer or a tablet. Verifier terminal 40, which can be connected to the network, can communicate with the plurality of servers included in blockchain platform 20.

In the present exemplary embodiment, verifier terminal 40, which is used by a verifier who verifies the analysis result, verifies the analysis result of security analysis recorded in the blockchain. Verifier terminal 40 includes communicator 401, analysis information verification unit 402, and transaction generator 403, as illustrated in FIG. 1. Verifier terminal 40 includes: a processor; memory in which a program for causing the processor to perform a predetermined process is stored; and a communication interface, for example. This means that verifier terminal 40 provides the functions of elements by the processor executing a predetermined program using the memory.

Hereinafter, the elements will be described.

<Communicator 401>

Communicator 401, which is a wired or wireless communication interface, communicates with the plurality of servers included in blockchain platform 20. In the present exemplary embodiment, communicator 401 accesses the analysis transaction data transmitted to the blockchain and included in the generated block, thus obtains the analysis result included in the analysis transaction data, transmits the result of verification of the validity of the analysis result, and transmits the generated transaction data, for example.

In the present exemplary embodiment, communicator 401 accesses the analysis transaction data transmitted to the blockchain and included in the generated block, and obtains the analysis result included in the analysis transaction data and the threat intelligence information indicated in the analysis result. Furthermore, communicator 401 transmits, to one of the plurality of severs included in blockchain platform 20, the result of verification of the validity of the analysis result that has been generated by analysis result verification unit 402 to be described later. Note that when transaction generator 403 to be described later generates verification transaction data including the result of verification of the validity of the analysis result, it is sufficient that communicator 401 transmit the verification transaction data to one server included in the blockchain platform.

Furthermore, when transaction generator 403 generates transaction data including a smart contract, communicator 401 transmits the transaction data including the smart contract to the one server.

<Analysis Result Verification Unit 402>

Analysis result verification unit 402 verifies the validity of the analysis result included in the analysis transaction data obtained by communicator 401, and generates a verification result that is the result of the verification. Analysis result verification unit 402 may generate the verification result by performing the matching between signature information of malware in the threat intelligence information included in the analysis transaction data and a byte sequence in a trace included in the log information included in the analysis transaction data. When the result of matching shows a substantial match, this means that the validity of the analysis result has been verified; therefore, analysis result verification unit 402 generates a verification result indicating that the validity of the analysis result included in the analysis transaction data has been verified. Furthermore, analysis result verification unit 402 may generate a verification result by performing matching between a communication establishment condition included in specification information and content of actually established communication included in the log information included in the analysis transaction data. When the result of matching shows a substantial match, this means that the validity of the analysis result has been verified; therefore, analysis result verification unit 402 generates a verification result indicating that the validity of the analysis result included in the analysis transaction data has been verified.

Figure 7:
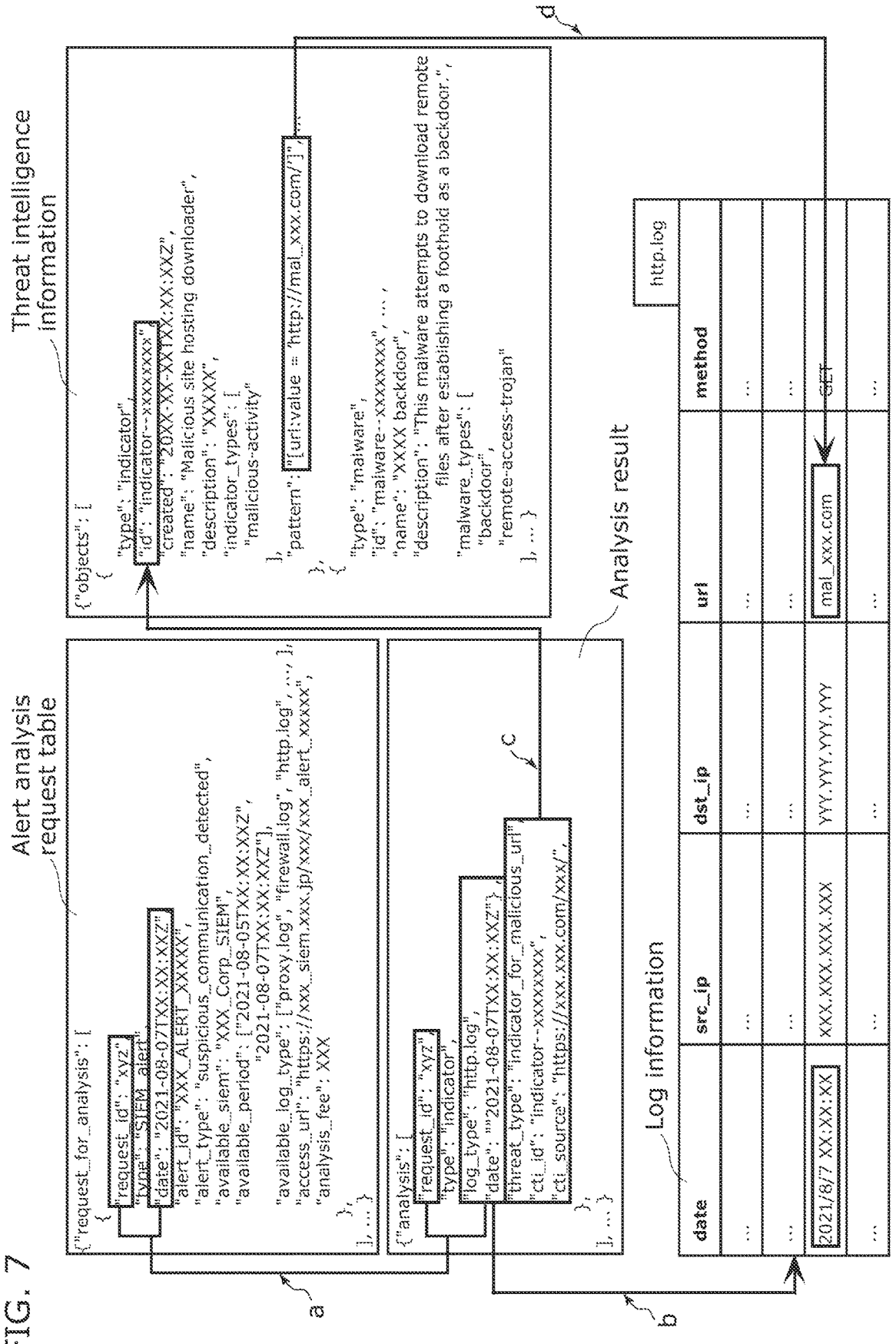
FIG. 7 is an explanatory diagram illustrating one example of a method for verifying the validity of an analysis result included in analysis transaction data according to an exemplary embodiment.

FIG. 7 is an explanatory diagram illustrating one example of a method for verifying the validity of the analysis result included in the analysis transaction data according to the exemplary embodiment. In the example illustrated in FIG. 7, using the alert analysis request table illustrated in FIG. 3 and the threat intelligence information illustrated in FIG. 6, a verifier who uses verifier terminal 40 verifies the validity of the analysis result illustrated in FIG. 5.

First, a verifier checks the analysis request ID (request_id) and time (date) indicated in "a" from the alert analysis request table illustrated in FIG. 3 and the analysis result illustrated in FIG. 5. Specifically, first, the verifier checks which alert analysis request corresponds to the analysis result currently subject to the verification that is included in the analysis transaction data transmitted to the blockchain and included in the generated block and whether the time indicated in the alert analysis request table and the time indicated in the analysis result are temporally close. Being temporally close means being within one hour, for example, but this is not limiting; being temporally close may mean being within a few minutes or may mean being within a few hours.

Next, the verifier extracts the log information associated with the analysis result that is indicated in a row of the table illustrated at the bottom of FIG. 7, with reference to the type of a log (log_type), the time (date), and the like, as indicated in "b", from the analysis result illustrated in FIG. 5. Specifically, first, a verifier extracts time (date), a source (src_ip), a destination (dst_ip), URL information (url), etc., from the type of a log (log_type) and the time (date) indicated in the analysis result, and holds these as the log information associated with the analysis result.

Furthermore, as indicated in "c", with reference to the information indicated in the analysis result illustrated in FIG. 5, the verifier extracts the threat intelligence information serving as the basis of the analysis result. Specifically, first, the verifier extracts the threat intelligence information serving as the basis of the analysis result on the basis of the identifier of the threat intelligence information (cti_id) and the information source of the threat intelligence information (cti_source) indicated in the analysis result.

Next, by comparing the extracted log information and the extracted threat intelligence information, the verifier checks whether the analysis result is valid.

In the example illustrated in FIG. 7, the type of threat (threat_type) of the alert analyzed by the analyst that is included in the analysis result illustrated in FIG. 5 is indicated as "indicator_for_malicious_url". Therefore, as indicated in "d", the verifier checks whether there is a match between the URL information included in the extracted log information and the URL information that is included in the tag indicated by "type": "indicator" in the extracted threat intelligence information and that is included in [url: value='http://mal_xxx.com/'] indicated as characteristics (pattern). When there is a match in the URL information, the analysis result is confirmed to be valid. In this manner, the verifier can verify the validity of the analysis result by performing the matching between the byte sequence of the URL, etc., of malware included in the threat intelligence information and the byte sequence of the URL, etc., included in the log information.

Note that when the type of threat (threat_type) of the alert indicated in the analysis result is not "indicator_for_malicious_url", verification corresponding to that type of threat is performed.

For example, there are cases where the information of the alert included in the request transaction data includes a trace (the byte sequence information of a raw packet). In this case, the validity of the analysis result may be verified by performing matching between the signature information of malware included in the threat intelligence information and the regular expression of a byte sequence included in the trace included in the log information extracted from the analysis result. Furthermore, for example, there are cases where the information of the alert included in the request transaction data includes a trace (the byte sequence information of a raw packet) obtained due to an anomaly in the communication with a controller. In this case, it is possible to verify the validity of the analysis result by performing matching between a communication establishment condition included in specification information such as PICS in BACnet and content of actually established communication included in the log information extracted from the analysis result, for example.

Note that there are cases where before the analysis result included in the analysis transaction data obtained by communicator 401, that is, the analysis result currently subject to the verification, an analysis result for the same analysis request ID already exists.

In this case, before verifying the validity of the analysis result currently subject to the verification, analysis result verification unit 402 calculates a degree of similarity between the analysis result currently subject to the verification and the analysis result for the same analysis request ID that exists, and when the degree of similarity calculated exceeds a threshold value, avoids verifying the validity of the analysis result currently subject to the verification. In other words, first, analysis result verification unit 402 calculates a degree of similarity between the analysis result included in the analysis transaction data currently subject to the verification and the analysis result included in the analysis transaction data that has been generated earlier than said analysis transaction data currently subject to the verification. When the degree of similarity calculated exceeds a predetermined threshold value, analysis result verification unit 402 does not verify the validity of the analysis result included in the analysis transaction data currently subject to the verification. Subsequently, analysis result verification unit 402 generates a verification result indicating that the analysis transaction data currently subject to the verification has been excluded from the verification. Thus, when the verification result indicating that the analysis transaction data has been excluded from the verification is transmitted to one of the plurality of servers included in blockchain platform 20, the block including the analysis transaction data will not be recorded into the distributed ledger.

Another option is that when the verification transaction data including said verification result is generated and transmitted to one of the plurality of servers included in blockchain platform 20, the verification transaction data for said analysis result will not be recorded into the distributed ledger. In this case, the block including the analysis transaction data has already been generated and may have been recorded into the distributed ledger, but does not need to have been recorded into the distributed ledger. This is because, when the block including the verification transaction data is not recorded into the distributed ledger, analyst terminal 30 that has generated the analysis result corresponding to said verification result included in the verification transaction data can be kept from being remunerated.

Therefore, when two or more pieces of analysis transaction data including the same analysis result are generated for one request for security analysis and the block including said analysis transaction data is generated and recorded into the distributed ledger, the analysis result included in the analysis transaction data that has not been generated first is not verified, and the verification transaction data is not recorded into the blockchain. As a result, the principle of competition can be introduced among analysts, and thus the analysis result of the security analysis can be obtained at high speed and low cost.

The following will describe one example of a method for calculating a degree of similarity between the analysis results included in two pieces of analysis transaction data generated for the same analysis request ID.

FIG. 8A illustrates one example of the analysis result included in analysis transaction data 1 generated for the same analysis request ID according to the exemplary embodiment. FIG. 8B illustrates one example of the analysis result included in analysis transaction data 2 generated for the same analysis request ID according to the exemplary embodiment.

For example, the verifier can calculate the degree of similarity between the analysis result illustrated in FIG. 8A and the analysis result illustrated in FIG. 8B as the sum of the distance between time (date) of the log information included in one analysis result and time (date) of the log information included in the other analysis result and the distance between the threat intelligence information (cti) used for one analysis result and the threat intelligence information (cti) used for the other analysis result, using Expression 1 to Expression 3 below.

$$dist(analysis1, analysis2) = \qquad \text{(Expression 1)}$$
$$datedist(date1, date2) + ctidist(cit1, cist2)$$
$$datedist(date1, date2) = \qquad \text{(Expression 2)}$$
$$|UNIXTIME \text{ on date } 1 - UNIX\_TIME \text{ on date } 2|/86400$$
$$ctidist(cit1, cist2) = 1 - \qquad \text{(Expression 3)}$$
$$\text{(the degree of similarity between } cti1 \text{ and}$$
$$cti2 \text{ on a scale of 0 to 1)}$$

Here, date 1 is time (date) included in the analysis result of analysis transaction data 1 illustrated in FIG. 8A, and date 2 is time (date) included in the analysis result of analysis transaction data 2 illustrated in FIG. 8B. And 86400 is a value obtained by converting 24 hours, which is one day, into seconds. Similarly, cti1 is threat intelligence information extracted from the analysis result of analysis transaction data 1 illustrated in FIG. 8A, and cti2 is threat intelligence information extracted from the analysis result of analysis transaction data 2 illustrated in FIG. 8B.

Note that for the purpose of exchange of threat information between security companies, STIX2, which is a standardized and structured format for describing threat information, provides a method for outputting the degree of similarity between two pieces of threat intelligence information in the range of 0 to 100. In this method, each of fields such as name is weighted, and pieces of threat intelligence information are compared for each of the fields, and the degree of similarity between the pieces is calculated in the form of (the total weight on matching fields)/(the total weight on comparison target fields), for example.

When dist(analysis1, analysis2)<T, that is, when dist (analysis1, analysis2) calculated is less than threshold value T, a verifier can determine that these analysis results are similar or the same. In other words, when dist(analysis1, analysis2) calculated is less than threshold value T, the degree of similarity between the analysis result illustrated in FIG. 8A and the analysis result illustrated in FIG. 8B exceeds a predetermined threshold value, and a verifier can determine that these analysis results are similar or the same.

<Transaction Generator 403>

Transaction generator 403 may generate verification transaction data including the verification result generated by analysis result verification unit 402.

Furthermore, according to an operation performed by the verifier, transaction generator 403 may generate a smart contract for paying the analysis fee and generate transaction data including the smart contract generated. In a payment function for the smart contract generated, a logic may have been embedded to distribute 80% of the analysis fee set by a user who makes a request for security analysis to an analyst and remaining 20% of the analysis fee to one or more verifiers who have verified the result of the analysis conducted by said analyst, for example. The logic embedded in the payment function for the smart contract generated is not limited to this example; any logic that provides an incentive for an analyst to conduct analysis and an incentive for a verifier to conduct verification can be determined, as appropriate.

Note that when the request for security analysis is a request for threat hunting analysis instead of a request for analysis of an alert, it is sufficient that the log information included in the analysis transaction data be log information included in the relevant information, associated with the analysis result, and obtained by accessing the user environment. In this case, it is sufficient that the threat intelligence information included in the analysis transaction data be threat intelligence information serving as the basis of the analysis result and linked to said log information.

[Operations]

Next, the processing performed by security analysis system 1 configured as described above will be described.

[Broad Outline of Processing]

FIG. 9 is a flowchart illustrating the broad outline of processing performed by security analysis system 1 according to the exemplary embodiment. The broad outline of processing illustrated in FIG. 9 is a control method performed by one of the plurality of servers included in security analysis system 1 according to the exemplary embodiment. Each of the plurality of servers has a distributed ledger. In other words, the plurality of servers manage a blockchain.

First, one server obtains request transaction data including: an analysis request ID uniquely identifying a request for analysis; and an access method for accessing relevant information usable for the analysis (S1). In the present exemplary embodiment, the request transaction data is request transaction data generated by user terminal 10 and transmitted to the one server when a security product issues an alert in a user company or the like.

Next, the one server records a block into the distributed ledger after including, in the block, the request transaction data obtained in Step S1 (S2).

Next, the one server obtains analysis transaction data including: an analysis result corresponding to the analysis request ID included in the request transaction data; log information that is a portion of the relevant information that is associated with the analysis result; and threat intelligence information serving as the basis of the analysis result (S3). In the present exemplary embodiment, the analysis transaction data is analysis transaction data generated and transmitted to the one server by analyst terminal 30. The analysis transaction data includes the analysis result generated by conducting security analysis using the specifications and the threat intelligence information on the basis of the request for security analysis that has been recorded into the distributed ledger.

Next, the one server obtains a result of verification of the validity of the analysis result included in the analysis transaction data obtained in Step S3 (S4). In the present exemplary embodiment, using verifier terminal 40, one or more verifiers verify the analysis result of security analysis recorded in the distributed ledger, and generate verification results. The one or more verifiers may generate verification transaction data including the generated verification results, and transmit the verification transaction data to the one server. Note that when the analysis result of security analysis recorded in the distributed ledger is similar to another analysis result recorded earlier in the distributed ledger, said analysis result is considered invalid, and a verification result including an indication to that effect is generated without the validity of said analysis result being verified.

Next, when the verification result obtained in Step S4 indicates that the validity of the analysis result included in the analysis transaction data has been verified, the one server records a block into the distributed ledger after including the analysis transaction data in the block (S5).

[Alert Analysis Process]

Next, an example of the alert analysis process performed by security analysis system 1 will be described.

Figure 13:
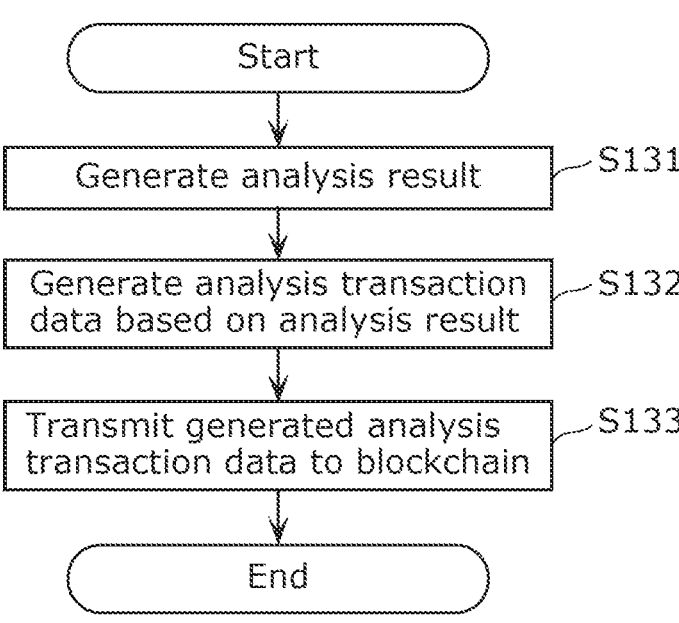
FIG. 13 is a flowchart illustrating details of an analysis result transmission process illustrated in FIG. 10.
Figure 15:
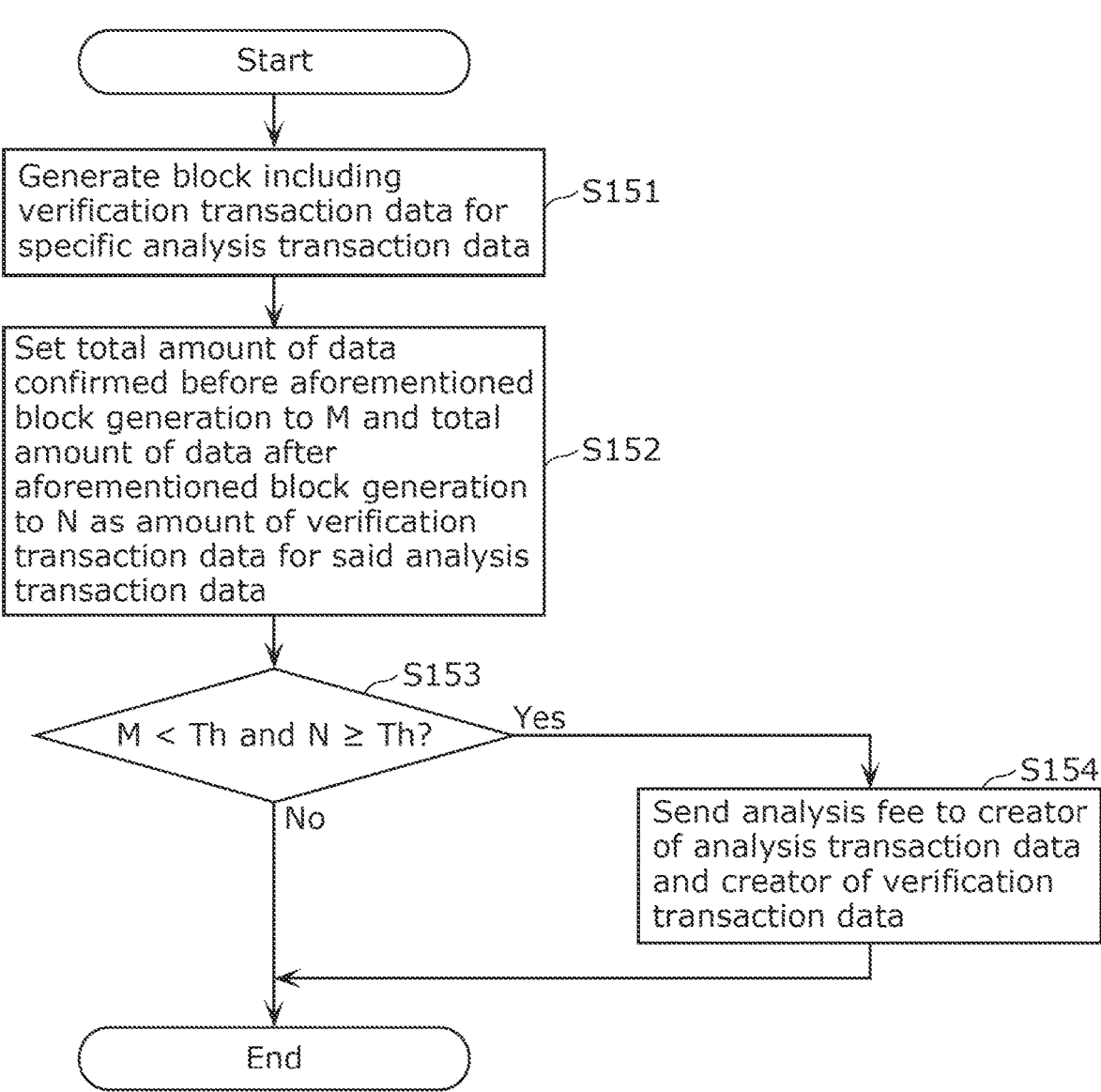
FIG. 15 is a flowchart illustrating details of a fee payment process illustrated in FIG. 10.

FIG. 10 is a flowchart illustrating the broad outline of the example of the alert analysis process according to the exemplary embodiment. FIG. 11 is a flowchart illustrating details of a smart contract registration process (Step S10) illustrated in FIG. 10. FIG. 12 is a flowchart illustrating details of an alert analysis request process (Step S12) illustrated in FIG. 10. FIG. 13 is a flowchart illustrating details of an analysis result transmission process (Step S13) illustrated in FIG. 10. FIG. 14 is a flowchart illustrating details of a verification result transmission process (Step S14) illustrated in FIG. 10. FIG. 15 is a flowchart illustrating details of a fee payment process (Step S15) illustrated in FIG. 10.

First, in FIG. 10, security analysis system 1 performs the smart contract registration process (S10).

More specifically, as illustrated in FIG. 11, according to an operation performed by a verifier, in order for outsourcing of security analysis, verifier terminal 40 generates an analysis fee pooling function and a fee payment function and registers these functions into the blockchain (S101). In the present exemplary embodiment, verifier terminal 40 generates a smart contract that includes the analysis fee pooling function and the fee payment function generated and is used for paying the analysis fee, and transmits the smart contract to one of the plurality of servers included in blockchain platform 20. Accordingly, the smart contract is registered into the blockchain and starts operating.

Next, in FIG. 10, security analysis system 1 performs the analysis fee pooling process (S11). In the present exemplary embodiment, user terminal 10 generates transaction data for registering a pooled fund for payment of the analysis fee, and transmits the transaction data to one of the plurality of servers that manage the blockchain. Accordingly, the analysis fee pooling process is performed, and the pooled fund for payment of the analysis fee is registered into the blockchain.

Next, in FIG. 10, security analysis system 1 performs the alert analysis request process (S12).

More specifically, first, assume that a security product such as SIEM owned by a user has issued an alert, as illustrated in FIG. 12 (S121). Next, user terminal 10 obtains user input indicating whether to make a request for analysis of the alert issued (S122). Subsequently, user terminal 10 checks whether there is input indicating that a request for analysis of the alert issued is to be made (S123), and when there is input indicating that the request is to be made (YES in S123), user terminal 10 obtains default settings information required to make a request for analysis (S124). Note that when there is no input indicating that the request is to be made in Step S123 (NO in S123), user terminal 10 ends the alert analysis request process. Subsequently, in user terminal 10, the settings information is changed according to user input (S125). Note that when there is no change in the default settings information, Step S125 is skipped. Next, user terminal 10 generates request transaction data for analysis of an alert on the basis of the analysis request settings information which is confirmed settings information (S126). Subsequently, user terminal 10 transmits, to the one server, the request transaction data generated in Step S126, and thus transmits said request transaction data to the blockchain (S127).

Next, in FIG. 10, security analysis system 1 performs the analysis result transmission process (S13).

More specifically, as illustrated in FIG. 13, first, on the basis of the request for analysis of the alert that is included in the request transaction data recorded in the blockchain, analyst terminal 30 generates an analysis result by conducting security analysis using the specifications and the threat intelligence information (S131). Next, analyst terminal 30 generates analysis transaction data on the basis of the analysis result generated in Step S131 (S132). Subsequently, analyst terminal 30 transmits, to the one server, the analysis transaction data generated in Step S132, and thus transmits said analysis transaction data to the blockchain (S133).

Next, in FIG. 10, security analysis system 1 performs the verification result transmission process (S14).

More specifically, as illustrated in FIG. 14, first, verifier terminal 40 examines whether there is an analysis result for the same analysis request ID that has been generated before the analysis result currently subject to the verification (S141). Note that Step S141 is performed before verification of the analysis result included in the analysis transaction data transmitted to the blockchain and included in the generated block in Step S13. Subsequently, verifier terminal 40 checks whether the analysis result already exists, specifically, whether there is an analysis result for the same analysis request ID that has been generated before the analysis result currently subject to the verification (S142).

When the analysis result already exists in Step S142 (YES in S142), verifier terminal 40 calculates the distance between the analysis result that already exists and the analysis result currently subject to the verification (S143). Subsequently, by checking whether the distance calculated in Step S143 is less than a threshold value, verifier terminal 40 determines whether these analysis results are similar (S144). When the calculated distance is not less than the threshold value in Step S144 (NO in S144), this means that these analysis results are not similar, and thus verifier terminal 40 proceeds to Step S145. Note that when there is no analysis result that already exists in Step S142 (NO in S142), verifier terminal 40 proceeds to Step S145 and verifies the validity of the analysis result currently subject to the verification (S145).

Subsequently, the result of the verification in Step S145 shows that said analysis result is valid (YES in S146), verifier terminal 40 generates verification transaction data including a verification result for said analysis result (S147). Next, verifier terminal 40 transmits the generated verification transaction data to the one server, and thus transmits said verification transaction data to the blockchain (S148). Note that verifier terminal 40 may avoid generating said verification transaction data and transmit only the verification result for said analysis result to the blockchain.

Note that when the calculated distance is less than the threshold value in Step S144 (YES in S144), these analysis results are similar, and thus verifier terminal 40 does not verify the analysis result currently subject to the verification and does not generate verification transaction data including a verification result for said analysis result (S149). In this case, verifier terminal 40 may transmit, to the blockchain, a verification result indicating that the analysis result currently subject to the verification has been excluded from the verification.

Furthermore, when said analysis result is not valid in Step S146 as a result of the verification conducted in Step S145 (NO in S146), verifier terminal 40 does not generate verification transaction data including a verification result for said analysis result (S149). In this case, it is sufficient that verifier terminal 40 transmit, to the blockchain, a verification result indicating that the analysis result currently subject to the verification is not valid.

Next, in FIG. 10, security analysis system 1 performs the fee payment process (S15).

More specifically, as illustrated in FIG. 15, first, one of the plurality of servers included in blockchain platform 20 generates a block including verification transaction data for specific analysis transaction data (S151). Subsequently, the one server sets the total amount of data confirmed before the block is generated in Step S151 to M and the total amount of data after the block is generated in Step S151 to N as the amount of verification transaction data for said analysis transaction data (S152). Here, M and N are natural numbers. Next, the one server checks whether M<threshold value Th and N≥threshold value Th (S153), and when this is true (YES in S153), the one server distributes and sends the analysis fee to the creator of the analysis transaction data and the creator of the verification transaction data (S154). Note that when M<threshold value Th and N≥threshold value Th are not true in Step S153 (NO in S153), the one server ends the fee payment process.

In this manner, security analysis system 1 provides a system that outsources security analysis on the blockchain and can verify the validity of the analysis result of the security analysis and reduce frauds.

[Sequence of Alert Analysis Process]

Next, the alert analysis process performed by security analysis system 1 will be described with reference to a sequence chart.

Figure 16:
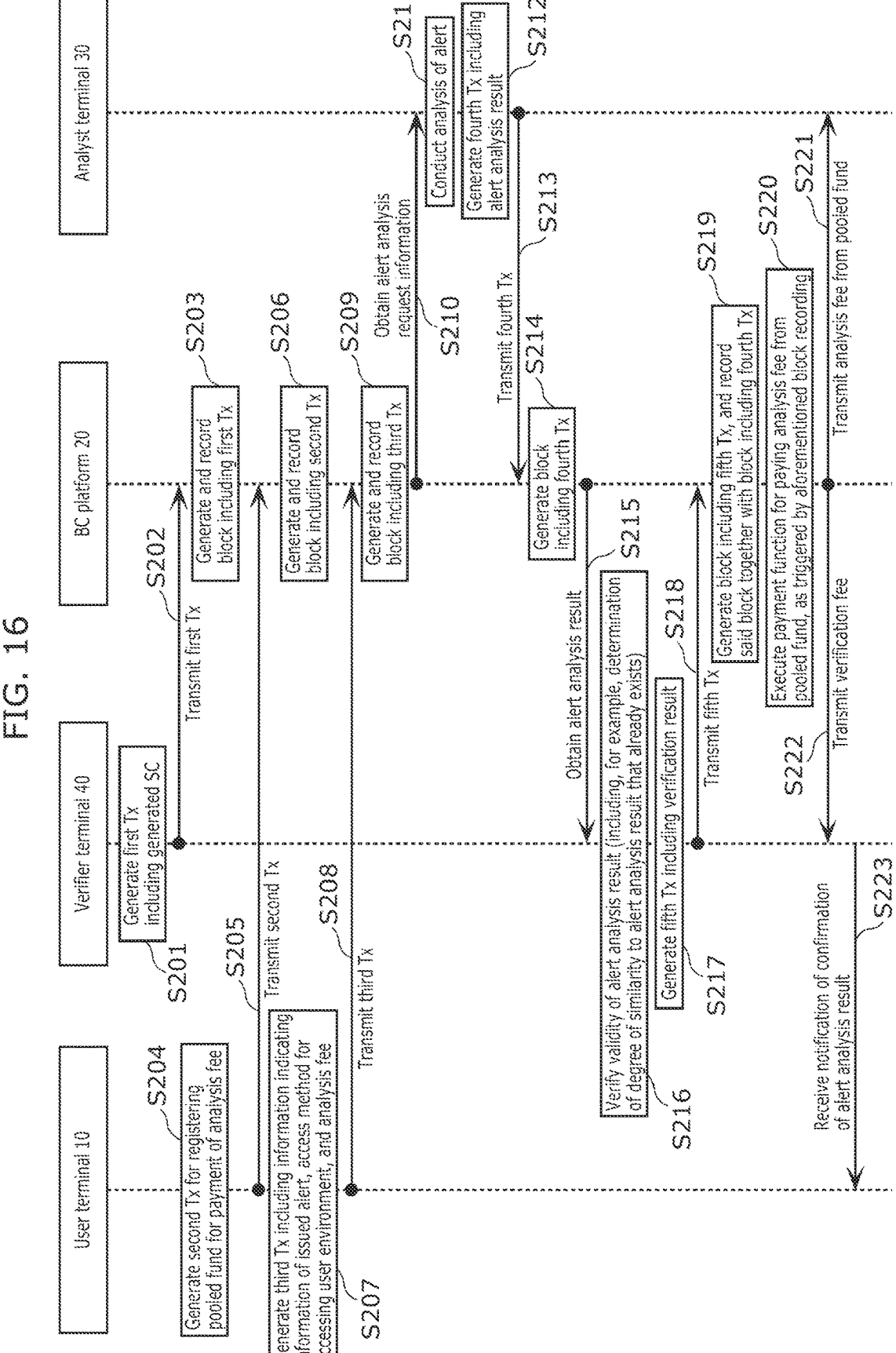
FIG. 16 is a sequence chart illustrating one example of an alert analysis process according to an exemplary embodiment.

FIG. 16 is a sequence chart illustrating one example of the alert analysis process according to the exemplary embodiment. The following will describe an example in which the verification transaction data including the verification result is generated.

First, verifier terminal 40 generates a smart contract for paying the analysis fee, and generates first transaction data including the generated smart contract (S201).

Next, verifier terminal 40 transmits, to blockchain platform 20, the first transaction data generated in Step S201 (S202). In the present exemplary embodiment, verifier terminal 40 transmits, to one of the plurality of servers included in blockchain platform 20, the first transaction data generated in Step S201.

Next, when blockchain platform 20 obtains the first transaction data, blockchain platform 20 generates a block including the first transaction data obtained, and records the block into the blockchain (S203). Specifically, when one of the plurality of servers included in blockchain platform 20 obtains the first transaction data, the one server generates a block including the first transaction data obtained. The one server records the generated block including the first transaction data into the blockchain by way of execution of a predetermined consensus algorithm with the other servers.

Furthermore, user terminal 10 generates second transaction data for registering a pooled fund for payment of the analysis fee (S204), and transmits the second transaction data to blockchain platform 20 (S205).

Next, when blockchain platform 20 obtains the second transaction data, blockchain platform 20 generates a block including the second transaction data obtained, and records the block into the blockchain (S206).

Furthermore, when a security product such as IDS owned by a user issues an alert, user terminal 10 generates third transaction data for making a request for analysis of the alert (S207). The third transaction data, which is the request transaction data described above, includes information indicating information of the issued alert such as an IDS log, an access method for accessing the user environment to be analyzed, and the analysis fee.

Next, user terminal 10 transmits, to blockchain platform 20, the third transaction data generated in Step S207 (S208).

Next, when blockchain platform 20 obtains the third transaction data, blockchain platform 20 generates a block including the third transaction data obtained, and records the block into the blockchain (S209).

Next, analyst terminal 30 obtains alert analysis request information indicating a request for analysis of the alert that is included in the third transaction data recorded in the blockchain (S210), and conducts analysis of the alert (S211). In the present exemplary embodiment, on the basis of the alert analysis request information obtained, analyst terminal 30 conducts analysis of the alert using the specifications and the threat intelligence information, and thus generates an analysis result (that will be herein referred to as an alert analysis result).

Next, analyst terminal 30 generates fourth transaction data including the alert analysis result obtained by conducting the analysis of the alert in Step S211 (S212). The fourth transaction data is the analysis transaction data described above.

Next, analyst terminal 30 transmits, to blockchain platform 20, the fourth transaction data generated in Step S212 (S213).

Next, when blockchain platform 20 obtains the fourth transaction data, blockchain platform 20 generates a block including the fourth transaction data obtained (S214).

Next, verifier terminal 40 obtains the alert analysis result included in the fourth transaction data included in the generated block (S215). Note that when the generated block is recorded in the distributed ledger, verifier terminal 40 can obtain, from the blockchain, the alert analysis result included in the fourth transaction data. On the other hand, when the generated block is not recorded in the blockchain, the alert analysis result included in the fourth transaction data can be obtained from the block including the fourth transaction data that has been broadcast. This is because, when the block including the fourth transaction data is generated, the generated block is confirmed and recorded into the blockchain after broadcasting and validation through the consensus algorithm.

Next, verifier terminal 40 verifies the validity of the alert analysis result obtained in Step S215 (S216). Note that during the verification of the validity of the alert analysis result, the degree of similarity between said alert analysis result and an alert analysis result that already exists is determined, for example.

Next, verifier terminal 40 generates fifth transaction data including the verification result obtained by verifying the validity of the alert analysis result in Step S216 (S217). The fifth transaction data is the verification transaction data described above.

Next, verifier terminal 40 transmits, to blockchain platform 20, the fifth transaction data generated in Step S217 (S218).

Next, when blockchain platform 20 obtains the fifth transaction data, blockchain platform 20 generates a block including the fifth transaction data obtained, and records the block into the blockchain together with the block including the fourth transaction data (S219). Note that when the block including the fourth transaction data is already recorded in the blockchain, it is only required that a bock including the obtained fifth transaction data alone be generated and recorded into the blockchain.

Next, as triggered by the blocks including the fourth transaction data and the fifth transaction data being recorded, blockchain platform 20 causes a payment function for paying a payment fee from the pooled fund in the smart contract to be executed (S220).

Next, as a result of causing the payment function to be executed in Step S220, blockchain platform 20 transmits the analysis fee to analyst terminal 30 from the pooled fund (S221), and transmits the verification fee to verifier terminal 40 from the pooled fund (S222). The verification fee is a portion of the analysis fee included in the third transaction data in Step S207 and therefore also hereinabove referred to as the analysis fee.

Next, when obtaining the verification fee transmitted in Step S222, verifier terminal 40 transmits the notification of confirmation of the alert analysis result to user terminal 10 (S223).

As described above, the analysis transaction data is recorded into the distributed ledger only when the validity of the alert analysis result included in the analysis transaction data generated by conducting, as security analysis, analysis of the alert issued by a security product is verified.

This makes it possible to not only verify the validity of the analysis result of the issued alert, but also reduce frauds by using the tamper-proof function of the blockchain.

Furthermore, the remuneration for analysis of the alert is automatically provided to the analyst using the smart contract, which will be an incentive for the analyst to conduct the analysis of the alert. Similarly, using the smart contract, the remuneration for analysis of the alert is automatically distributed to one or more verifiers who have verified the analysis result, which will be an incentive for the verifiers to conduct the verification of the alert analysis result. With these, the outsourced analysis of the alert can be conducted promptly.

[Sequence of Threat Hunting]

Next, the threat hunting analysis process performed by security analysis system 1 will be described with reference to a sequence chart. A request for threat hunting analysis is a request for security analysis that is made at a stage where a security product has not issued an alert.

Figure 17:
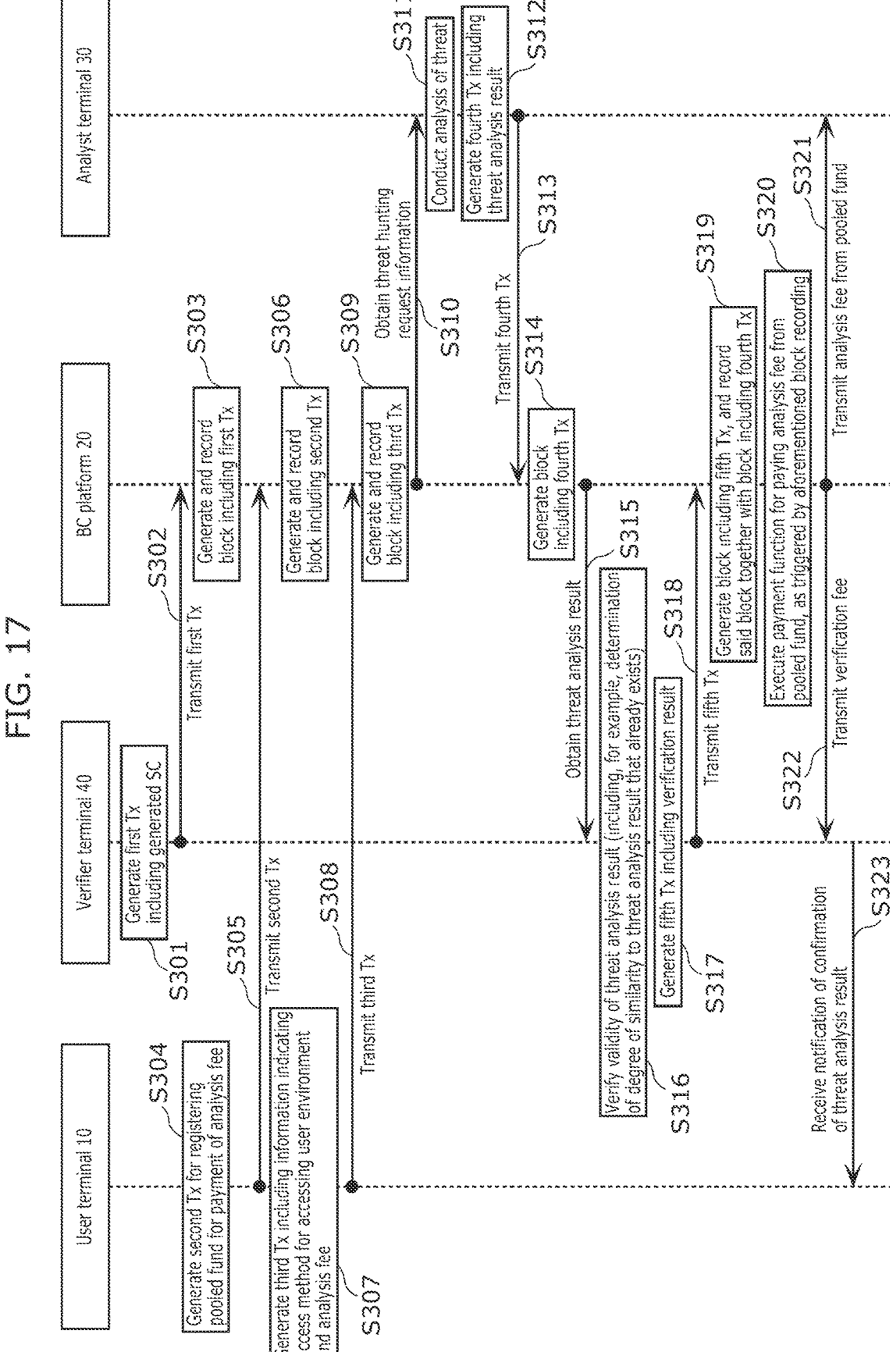
FIG. 17 is a sequence chart illustrating one example of a threat hunting analysis process according to an exemplary embodiment.

FIG. 17 is a sequence chart illustrating one example of the threat hunting analysis process according to the exemplary embodiment. Note that Step S301 to Step S306 are the same as the processes in Step S201 to Step S206 described with reference to FIG. 16 and therefore, description thereof will be omitted. The following will also describe an example in which the verification transaction data including the verification result is generated.

In Step S307, user terminal 10 generates third transaction data for making a request for threat hunting analysis. The third transaction data, which is the request transaction data described above, includes information indicating: an access method for accessing the user environment to be analyzed; and the analysis fee.

Next, user terminal 10 transmits, to blockchain platform 20, the third transaction data generated in Step S307 (S308).

Next, when blockchain platform 20 obtains the third transaction data, blockchain platform 20 generates a block including the third transaction data obtained, and records the block into the blockchain (S309).

Next, analyst terminal 30 obtains threat hunting analysis request information indicating a request for threat hunting analysis that is included in the third transaction data recorded in the blockchain (S310), and conducts analysis of a threat (S311). For example, on the basis of the threat hunting analysis request information obtained, analyst terminal 30 conducts analysis of the threat using the specifications and the threat intelligence information, and thus generates an analysis result (that will be herein referred to as a threat analysis result).

Next, analyst terminal 30 generates fourth transaction data including the threat analysis result obtained by conducting the threat hunting analysis in Step S311 (S312). The fourth transaction data corresponds to the analysis transaction data described above.

Next, analyst terminal 30 transmits, to blockchain platform 20, the fourth transaction data generated in Step S312 (S313).

Next, when blockchain platform 20 obtains the fourth transaction data, blockchain platform 20 generates a block including the fourth transaction data obtained (S314).

Next, verifier terminal 40 obtains the threat analysis result included in the fourth transaction data included in the generated block (S315). Note that when the generated block is recorded in the blockchain, verifier terminal 40 can obtain, from the blockchain, the threat analysis result included in the fourth transaction data. On the other hand, when the generated block is not recorded in the blockchain, the threat analysis result included in the fourth transaction data can be obtained from the block including the fourth transaction data that has been broadcast.

Next, verifier terminal 40 verifies the validity of the threat analysis result obtained in Step S315 (S316). Note that during the verification of the validity of the threat analysis result, the degree of similarity between said threat analysis result and a threat analysis result that already exists is determined, for example.

Next, verifier terminal 40 generates fifth transaction data including the verification result obtained by verifying the validity of the threat analysis result in Step S316 (S317). The fifth transaction data corresponds to the verification transaction data described above.

Next, verifier terminal 40 transmits, to blockchain platform 20, the fifth transaction data generated in Step S317 (S318).

Next, when blockchain platform 20 obtains the fifth transaction data, blockchain platform 20 generates a block including the fifth transaction data obtained, and records the block into the blockchain together with the block including the fourth transaction data (S319). Note that when the block including the fourth transaction data is already recorded in the blockchain, it is only required that a bock including the obtained fifth transaction data be generated and recorded into the blockchain.

Next, as triggered by the blocks including the fourth transaction data and the fifth transaction data being recorded, blockchain platform 20 causes a payment function for paying a payment fee from the pooled fund in the smart contract to be executed (S320).

Next, as a result of causing the payment function to be executed in Step S320, blockchain platform 20 transmits the analysis fee to analyst terminal 30 from the pooled fund (S321), and transmits the verification fee to verifier terminal 40 from the pooled fund (S322). The verification fee is a portion of the analysis fee included in the third transaction data in Step S307.

Next, when obtaining the verification fee transmitted in Step S322, verifier terminal 40 transmits the notification of confirmation of the threat analysis result to user terminal 10 (S323).

As described above, the threat hunting analysis is conducted at a stage where a security product has not issued an alert, and the analysis transaction data is recorded into the distributed ledger only when the validity of the threat analysis result included in the analysis transaction data generated is verified.

This makes it possible to not only verify the validity of the threat analysis result, but also reduce frauds by using the tamper-proof function of the blockchain.

Furthermore, the remuneration for threat hunting analysis is automatically provided to the analyst using the smart contract, which will be an incentive for the analyst to conduct the threat hunting analysis. Similarly, using the smart contract, the remuneration for threat hunting analysis is automatically distributed to one or more verifiers who have verified the analysis result, which will be an incentive for the verifiers to conduct the verification of the threat hunting analysis result. With these, the outsourced threat hunting analysis can be conducted promptly.

Advantageous Effects, Etc

As described above, with the method, etc., for controlling security analysis system 1 according to the exemplary embodiment, the validity of the analysis result of security analysis can be verified, and frauds can be reduced. More specifically, the analysis transaction data is recorded into the distributed ledger only when the validity of the analysis result included in the analysis transaction data is verified. This makes it possible to not only verify the validity of the analysis result of the issued alert, but also reduce frauds by using the tamper-proof function of the blockchain.

Furthermore, since the request transaction data is recorded into the distributed ledger, it is possible to make a request for security analysis to two or more SOC vendors, in other words, two or more analysts, in a competitive manner, instead of making the request for security analysis to only one SOC vendor. As a result, the principle of competition can be introduced among analysts, and thus the analysis result of the security analysis can be obtained at high speed and low cost.

Figure 18:
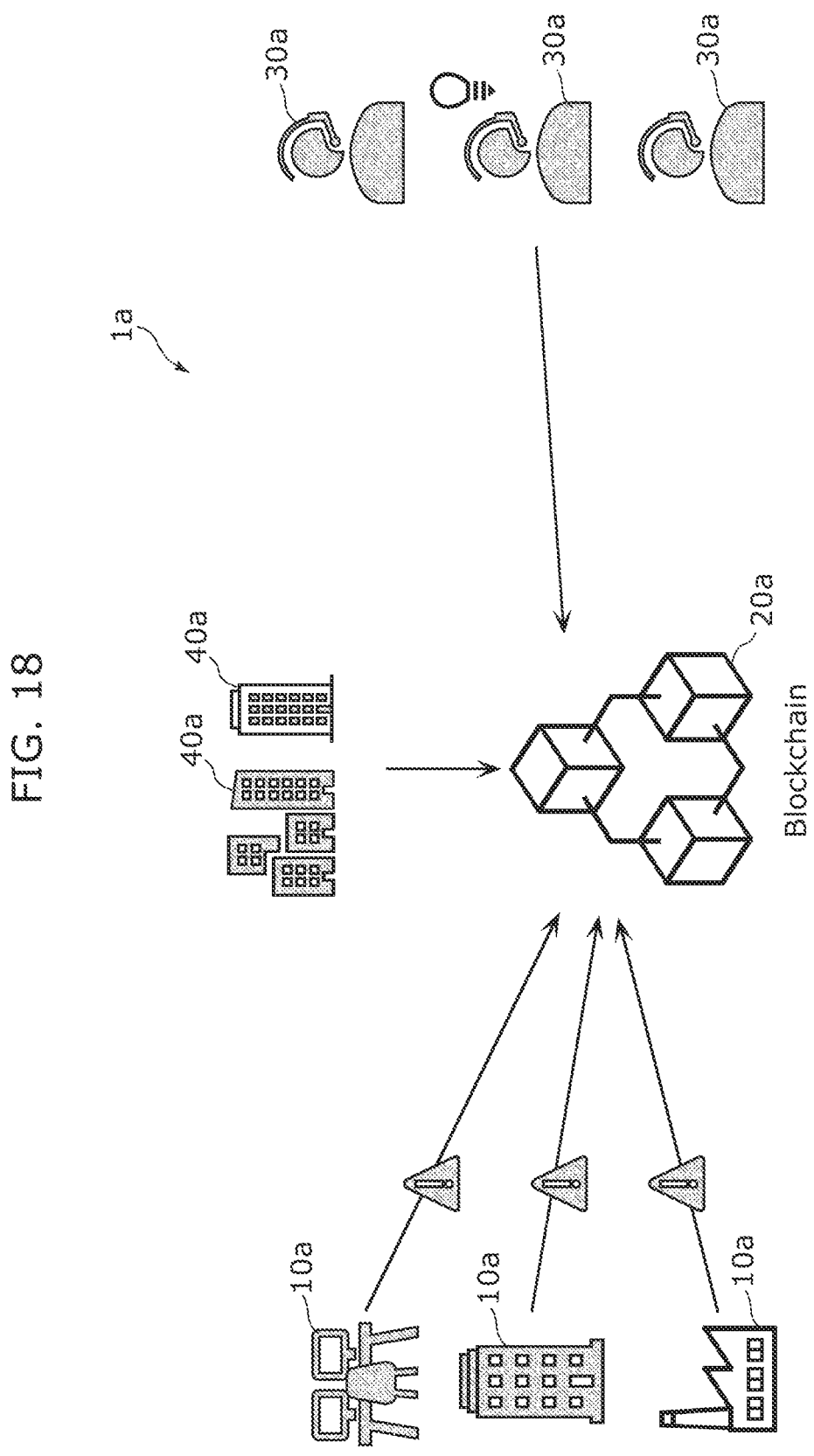
FIG. 18 is an explanatory diagram of a platform for outsourcing security analysis on a blockchain according to the present disclosure.

FIG. 18 is an explanatory diagram of platform 1a for outsourcing security analysis on the blockchain according to the present disclosure. FIG. 18 illustrates platform 1a in which user 10a makes a request for security analysis on blockchain 20a, and one of a large number of analysts 30a transmits, to blockchain 20a, an analysis result obtained by conducting the security analysis. User 10a, which is a company, a factory, a facility, or the like that has introduced a security product such as IDS or SIEM, generates request transaction data including a request for security analysis, and records the request transaction data into blockchain 20a, using user terminal 10 described above. The large number of analysts 30a typically belong to a plurality of SOC vendors, but may be individuals who can conduct security analysis. Using analyst terminal 30 described above, analyst 30a conducts security analysis in response to a request for security analysis that has been recorded in blockchain 20a. Analyst 30a generates analysis transaction data including an analysis result obtained as a result of conducting the security analysis, and transmits the analysis transaction data to blockchain 20a. In blockchain 20a, a block including the analysis transaction data transmitted thereto is generated. Blockchain 20a is realized on blockchain platform 20 described above.

FIG. 18 illustrates platform 1a in which one or more verifiers 40a verify the validity of the analysis result using a predetermined verification algorithm and only a block that includes analysis transaction data including an analysis result the validity of which has been verified is recorded into blockchain 20a.

One or more verifiers 40a are typically a plurality of organizations that are trusted, but may be persons who belong to the plurality of organizations. This is because there is a risk that if a verifier colludes with analyst 30a, the verifier may verify unconditionally that the analysis result from analyst 30a with whom the verifier colludes is valid. Note that when there is no such risk, each of one or more verifiers 40a may be an individual. Using verifier terminal 40 described above, each of one or more verifiers 40a verifies the validity of the analysis result included in the analysis transaction data, and transmits, to blockchain 20a, a verification result obtained by verifying the validity. In blockchain 20a, only a block is recorded that includes analysis transaction data including an analysis result indicated as valid in the verification result obtained. Note that the analysis transaction data may be generated as a block and recorded into blockchain 20a as long as the format of the analysis transaction data is correct. In this case, it is sufficient that the analysis transaction data recorded in blockchain 20a be regarded as not being accepted (recorded) because the analysis result included in the analysis transaction data is correct. When the analysis result is not correct, it is sufficient that the verification transaction data generated by a verifier will not be recorded into blockchain 20a. In other words, even when the analysis transaction data is recorded into blockchain 20a, verification transaction data generated by verifiers, the total amount of which is greater than or equal to a threshold value, is not recorded into blockchain 20a. As a result, analyst 30a who has generated an improper analysis result can be kept from obtaining remuneration.

Thus, platform 1a illustrated in FIG. 18 does not require system construction for each user 10a and can be realized on one blockchain platform 20 using blockchain 20a. Furthermore, in platform 1a illustrated in FIG. 18, the use of blockchain 20a allows a competitive system to be adopted, and thus the principle of competition can be introduced among analysts 30a. Moreover, in platform 1a illustrated in FIG. 18, as a result of using blockchain 20a, analysis results are open to the public, meaning that a fraud, etc., made by collusion between specific analysts is not possible.

Thus, it is possible to not only verify the validity of the analysis result of security analysis, but also reduce frauds by using the tamper-proof function of the blockchain.

Furthermore, in platform 1a illustrated in FIG. 18, by using a smart contract, it is possible to configure a system in which an analysis fee is transmitted to analyst 30a, etc., upon recording of a block including analysis transaction data. This means that platform 1a illustrated in FIG. 18 enables automatic payment of an analysis fee. Thus, it is possible to provide an incentive for analyst 30a to conduct the security analysis and provide an incentive for verifier 40a to conduct the verification of the analysis result of the security analysis.

Thus, with platform 1a illustrated in FIG. 18, user 10a can not only receive a low-cost, quick service of security analysis, but also have the security analysis verified to ensure that the security analysis has been properly conducted. Furthermore, with platform 1a illustrated in FIG. 18, verifier 40a who has verified the validity of the security analysis can receive remuneration for the verification, and analyst 30a who may be one individual having a security analysis skill can participate and receive remuneration for the analysis.

Note that there may be cases where two or more analysts 30a generate the same analysis results for one request for security analysis. In these cases, in platform 1a illustrated in FIG. 18, a degree of similarity between the analysis results is calculated using a degree of similarity in log information cited in the analysis results included in the analysis transaction data and a degree of similarity in the threat intelligence information used in the analysis results included in the analysis transaction data. When the degree of similarity is high, the analysis transaction data including the analysis result that is not the earliest analysis result is not recognized as a valid analysis result (no verification transaction is generated); this is a solution to these cases.

Furthermore, transmitting the entire log information associated with the alert issued or the entire user environment that is subject to threat hunting analysis from user 10a to blockchain 20a at the time of requesting security analysis is impractical in view of capacity and difficulty in relevant information prediction, for example. The user environment herein is an environment of settings and configurations of a device, a network, a system, an application, or the like that has introduced and operates a security product. In this regard, in platform 1a illustrated in FIG. 18, the access method for accessing the relevant information including the user environment that is usable for security analysis is transmitted to blockchain 20a at the time of requesting security analysis. This allows analyst 30a to obtain the relevant information required for the security analysis and conduct the security analysis.

Other Exemplary Embodiments, Etc

The present disclosure has been described thus far based on the above exemplary embodiment, but it goes without saying that the present disclosure is not limited to the above exemplary embodiment. The following examples are also intended to be included within the scope of the present disclosure.

(1) Each of the devices according to the above exemplary embodiment is specifically a computer system configured from a microprocessor, read-only memory (ROM), random-access memory (RAM), a hard disk unit, a display unit, a keyboard, and a mouse, for example. A computer program is recorded in the RAM or the hard disk unit. Each of the devices achieves its function as a result of the microprocessor operating according to the computer program. Here, the computer program is configured of a combination of command codes indicating instructions to the computer in order to achieve a predetermined function.

(2) Some or all of the structural elements included in each of the devices according to the above exemplary embodiment may be configured from a single system Large Scale Integration (LSI). A system LSI is a super-multifunctional LSI manufactured with a plurality of components integrated on a single chip, and is specifically a computer system configured of a microprocessor, ROM, and RAM, for example. A computer program is recorded in the RAM. The system LSI achieves its function as a result of the microprocessor operating according to the computer program.

Furthermore, each unit of the structural elements included in each of the devices described above may be individually configured into a single chip, or some or all of the units may be configured into a single chip.

Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(3) Some or all of the structural elements included in each of the devices described above may be implemented as a standalone module or an IC card that can be inserted into and removed from the device. The IC card or the module is a computer system made up of a microprocessor, ROM, RAM, and so on. The IC card or the module may include the aforementioned super-multifunctional LSI. The IC card or the module achieves its functions as a result of the microprocessor operating according to the computer program. The IC card and the module may be tamper-proof.

(4) The present disclosure may be the above-described methods. Furthermore, the present disclosure may be a computer program for implementing these methods using a computer or may be a digital signal of the computer program.

Furthermore, the present disclosure may be the computer program or the digital signal recorded on recording media readable by a computer, such as a flexible disk, a hard disk, a compact disc read-only memory (CD-ROM), a magneto-optical disc (MO), a digital versatile disc (DVD), a DVD-ROM, a DVD-RAM, a Blu-ray (registered trademark) disc (BD), or a semiconductor memory, for example. The present disclosure may also be the digital signal recorded on these recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and memory. The memory may have the computer program recorded thereon, and the microprocessor may operate according to the computer program.

Moreover, by transferring the recording medium having the program or the digital signal recorded thereon or by transferring the program or the digital signal via the network or the like, the present disclosure may be implemented by a different independent computer system.

(5) The above exemplary embodiment and the above variations may be combined with each other.

INDUSTRIAL APPLICABILITY

The present disclosure can be applied to control methods, servers, programs, and security analysis systems, and is applicable, for example, to a control method, a server, a program, a security analysis system, and the like that are used to analyze threat to information security using a blockchain platform.

The invention claimed is:

1. A control method that is performed by one server included in a security analysis system including a plurality of servers each including a distributed ledger, the control method comprising:

obtaining request transaction data including an analysis request identification (ID) uniquely identifying a request for analysis, and access information indicating an access method for accessing relevant information usable for the analysis;

recording a block into the distributed ledger after including, in the block, the request transaction data obtained;

obtaining analysis transaction data and generating a block including the analysis transaction data obtained, the analysis transaction data including an analysis result corresponding to the analysis request ID included in the request transaction data recorded, log information used to generate the analysis result and being is a portion of the relevant information, and threat intelligence information serving as a basis of the analysis result;

obtaining a verification result that is a result of verification of validity of the analysis result included in the analysis transaction data; and when the verification result obtained indicates that the validity of the analysis result included in the analysis transaction data has been verified, recording the block including the analysis transaction data into the distributed ledger, wherein the result of the verification of the validity is a result obtained by performing matching between (i) a first piece of information included in the threat intelligence information included in the analysis transaction data and (ii) a second piece of information included in the log information included in the analysis transaction data.

2. The control method according to claim 1, wherein the analysis is analysis of an alert issued by a security product, the request transaction data includes information of the alert issued by the security product, the analysis request ID, and the access information, the log information included in the analysis transaction data is log information included in the relevant information, associated with the analysis result, and actually used for the analysis, and the threat intelligence information included in the analysis transaction data is threat intelligence information serving as the basis of the analysis result and corresponding to a cause of the alert.

3. The control method according to claim 2, wherein the access information included in the request transaction data includes an access destination of and access rights to relevant information usable for the analysis and required for the analysis.

4. The control method according to claim 1, wherein the analysis is threat hunting analysis, the access information included in the request transaction data includes an access destination of and access rights to relevant information usable for the analysis and indicating an environment in which security monitoring is ongoing, the log information included in the analysis transaction data is log information included in the relevant information, associated with the analysis result, and obtained by accessing the environment, and the threat intelligence information included in the analysis transaction data is threat intelligence information serving as the basis of the analysis result and linked to the log information.

5. The control method according to claim 1, wherein the request transaction data further includes:

information indicating an analysis fee for the request for the analysis.

6. The control method according to claim 1, further comprising:

canceling the request for the analysis that is specified by the analysis request ID, when (i) cancellation transaction data including the analysis request ID and information indicating cancellation of the request for the analysis is obtained before the analysis transaction data is obtained after the request transaction data is obtained and (ii) the cancellation transaction data is recorded into the distributed ledger.

7. The control method according to claim 1, wherein a digital signature generated by an authorized security company is provided to the threat intelligence information included in the analysis transaction data.

8. The control method according to claim 1, wherein the first piece of information is signature information of malware included in the threat intelligence information included in the analysis transaction data, the second piece of information is a byte sequence in a trace included in the log information included in the analysis transaction data, and the result of the verification of the validity is a result obtained by performing matching between (i) the signature information of the malware in the threat intelligence information included in the analysis transaction data and (ii) the byte sequence in the trace included in the log information included in the analysis transaction data.

9. The control method according to claim 1, wherein the request transaction data further includes one or more tags each indicating a type of the analysis, and the analysis transaction data further includes one or more tags each indicating the type of the analysis conducted to obtain the analysis result.

10. The control method according to claim 1, wherein information that is included in the access information and able to identify a user who makes the request for the analysis has been anonymized.

11. The control method according to claim 1, wherein the access information included in the request transaction data includes remote access rights to security information and event management (SIEM) that is used by a user who makes the request for the analysis.

12. The control method according to claim 1, wherein the access information included in the request transaction data includes information indicating an operation to obtain log information required for the analysis, the information being included in the relevant information usable for the analysis.

13. The control method according to claim 1, wherein when the verification result obtained indicates that the analysis transaction data has been excluded from verification, the analysis transaction data is not recorded into the distributed ledger.

14. The control method according to claim 13, wherein a degree of similarity between the analysis result included in the analysis transaction data currently subject to the verification and the analysis result included in the analysis transaction data that has been generated earlier than the analysis transaction data currently subject to the verification is calculated, and when the degree of similarity calculated exceeds a predetermined threshold value, the verification of the validity of the analysis result included in the analysis transaction data currently subject to the verification is skipped, and the verification result indicates that the analysis transaction data currently subject to the verification has been excluded from the verification.

15. The control method according to claim 1, wherein the first piece of information is URL information of malware included in the threat intelligence information included in the analysis transaction data, the second piece of information is URL information included in the log information included in the analysis transaction data, and the result of the verification of the validity is a result obtained by performing matching between (i) the URL information of the malware in the threat intelligence information included in the analysis transaction data and (ii) the URL information included in the log information included in the analysis transaction data.

16. A server included in a security analysis system including a plurality of servers each including a distributed ledger, the server comprising:

a processor; and memory, wherein using the memory, the processor obtains request transaction data including an analysis request identification (ID) uniquely identifying a request for analysis, and access information indicating an access method for accessing relevant information usable for the analysis, the processor records a block into the distributed ledger after including, in the block, the request transaction data obtained, the processor obtains analysis transaction data and generates a block including the analysis transaction data obtained, the analysis transaction data including an analysis result corresponding to the analysis request ID included in the request transaction data recorded, log information used to generate the analysis result and being a portion of the relevant information, and threat intelligence information serving as a basis of the analysis result, the processor obtains a verification result that is a result of verification of validity of the analysis result included in the analysis transaction data, and when the verification result obtained indicates that the validity of the analysis result included in the analysis transaction data has been verified, the processor records the block including the analysis transaction data into the distributed ledger, wherein the processor obtains the result of the verification of the validity by performing matching between (i) a first piece of information included in the threat intelligence information included in the analysis transaction data and (ii) a second piece of information included in the log information included in the analysis transaction data.

17. A non-transitory computer-readable recording medium having recorded thereon a program for causing a control method to be performed in a security analysis system including a plurality of servers each including a distributed ledger, the program causing a computer to execute:

obtaining request transaction data including an analysis request identification (ID) uniquely identifying a request for analysis, and access information indicating an access method for accessing relevant information usable for the analysis;

recording a block into the distributed ledger after including, in the block, the request transaction data obtained;

obtaining analysis transaction data including an analysis result corresponding to the analysis request ID included in the request transaction data recorded, log information used to generate the analysis result and being a portion of the relevant information, and threat intelligence information serving as a basis of the analysis result;

obtaining a verification result that is a result of verification of validity of the analysis result included in the analysis transaction data, and generating a block including the analysis transaction data; and when the verification result obtained indicates that the validity of the analysis result included in the analysis transaction data has been verified, recording the block including the analysis transaction data into the distributed ledger, wherein the result of the verification of the validity is a result obtained by performing matching between (i) a first piece of information included in the threat intelligence information included in the analysis transaction data and (ii) a second piece of information included in the log information included in the analysis transaction data.

18. A security analysis system comprising:

a user terminal that requests analysis;

an analyst terminal that conducts the analysis requested; and a plurality of servers each including a distributed ledger, wherein one server included in the plurality of servers includes a processor and memory, using the memory, the processor obtains, from the user terminal, request transaction data including an analysis request identification (ID) uniquely identifying a request for the analysis, and access information indicating an access method for accessing relevant information usable for the analysis, the processor records a block into the distributed ledger after including, in the block, the request transaction data obtained, the processor obtains, from the analyst terminal, analysis transaction data including an analysis result corresponding to the analysis request ID included in the request transaction data recorded, log information used to generate the analysis result and being a portion of the relevant information, and threat intelligence information serving as a basis of the analysis result, the processor obtains a verification result that is a result of verification of validity of the analysis result included in the analysis transaction data, and generates a block including the analysis transaction data, when the verification result obtained indicates that the validity of the analysis result included in the analysis transaction data has been verified, the processor records the block including the analysis transaction data into the distributed ledger, and the processor obtains the result of the verification of the validity by performing matching between (i) a first piece of information included in the threat intelligence information included in the analysis transaction data and (ii) a second piece of information included in the log information included in the analysis transaction data.

* * * * *